(12) United States Patent
Takayama et al.

(10) Patent No.: US 11,939,096 B2
(45) Date of Patent: Mar. 26, 2024

(54) BAG GRIPPING CLIP, CONTAINER, AND STIRRING METHOD

(71) Applicant: FUJIFILM CORPORATION, Tokyo (JP)

(72) Inventors: Hidetoshi Takayama, Kanagawa (JP); Kotaro Tashiro, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 923 days.

(21) Appl. No.: 16/822,116

(22) Filed: Mar. 18, 2020

(65) Prior Publication Data
US 2020/0216208 A1 Jul. 9, 2020

Related U.S. Application Data

(63) Continuation of application No. PCT/JP2018/032925, filed on Sep. 5, 2018.

(30) Foreign Application Priority Data

Sep. 26, 2017 (JP) ................................. 2017-184952

(51) Int. Cl.
*B65B 43/46* (2006.01)
*B01F 35/42* (2022.01)
(Continued)

(52) U.S. Cl.
CPC ............ *B65B 43/465* (2013.01); *B01F 35/42* (2022.01); *B65B 43/30* (2013.01); *B01F 23/452* (2022.01); *B01F 35/513* (2022.01)

(58) Field of Classification Search
CPC ....... B65B 43/30; B65B 43/465; B01F 35/42; B01F 35/513
(Continued)

(56) References Cited

U.S. PATENT DOCUMENTS 3,752,306 A 8/1973 Thompson et al.
4,957,689 A 9/1990 Ohnishi et al.
(Continued)

FOREIGN PATENT DOCUMENTS

JP S51-82728 U 7/1976
JP S60-147007 U 9/1985
(Continued)

OTHER PUBLICATIONS

English language translation of the following: Office action dated Feb. 9, 2021 from the JPO in a Japanese patent application No. 2019-544495 corresponding to the instant patent application. This office action translation is submitted now in order to supplement the understanding of the cited references which are being disclosed in the instant Information Disclosure Statement.
(Continued)

*Primary Examiner* — Marc C Howell
(74) *Attorney, Agent, or Firm* — SOLARIS Intellectual Property Group, PLLC

(57) ABSTRACT

Provided is a bag gripping clip, in which, in a case where a bag that forms an accommodation space between a first film and a second film facing the first film is gripped by the clip, a pressing force for bringing the first film and the second film into partially close contact with each other is applied to the bag, and a partition that divides the accommodation space into a plurality of spaces communicating with each other via a communication part is formed.

19 Claims, 22 Drawing Sheets

(51) Int. Cl.
  *B65B 43/30*   (2006.01)
  *B01F 23/45*   (2022.01)
  *B01F 35/513*  (2022.01)
(58) Field of Classification Search
  USPC .......................................................... 366/209
  See application file for complete search history.

(56) References Cited

U.S. PATENT DOCUMENTS

| | | | |
|---|---|---|---|
| 5,507,133 | A | 4/1996 | Singleton et al. |
| 6,123,696 | A | 9/2000 | Coelho et al. |
| 9,072,355 | B1* | 7/2015 | Magnani ................. A45D 8/24 |
| 2004/0055616 | A1* | 3/2004 | Twomey ................. A45D 8/20 |
| | | | 132/277 |
| 2010/0026970 | A1 | 2/2010 | Tanaka |
| 2015/0117798 | A1* | 4/2015 | Taghvai ............. B65D 33/2566 |
| | | | 383/38 |
| 2016/0145030 | A1* | 5/2016 | Malligan ................. A23L 25/20 |
| | | | 426/120 |
| 2017/0044477 | A1 | 2/2017 | Gebauer et al. |
| 2020/0216208 | A1 | 7/2020 | Takayama et al. |

FOREIGN PATENT DOCUMENTS

| | | | |
|---|---|---|---|
| JP | S63-309263 | A | 12/1988 |
| JP | H02-113766 | A | 4/1990 |
| JP | H4-53678 | U | 5/1992 |
| JP | H5-278751 | A | 10/1993 |
| JP | H10-201818 | A | 8/1998 |
| JP | 2002-291874 | A | 10/2002 |
| JP | 2006-27617 | A | 2/2006 |
| JP | 2006-141857 | A | 6/2006 |
| JP | 3146608 | U | 11/2008 |
| JP | 2010-263801 | A | 11/2010 |
| JP | 2011-239734 | A | 12/2011 |
| JP | 2012051615 | A | 3/2012 |
| JP | 2014200541 | A | 10/2014 |
| JP | 2014200543 | A | 10/2014 |
| KR | 102391563 | B1 | 4/2022 |
| WO | 2008/117705 | A1 | 10/2008 |
| WO | 2013/175797 | A1 | 11/2013 |
| WO | 2019-065135 | A1 | 4/2019 |

OTHER PUBLICATIONS

English language translation of the following: Office action dated Jan. 25, 2022 from the JPO in a Japanese patent application No. 2019-544495 corresponding to the instant patent application. This office action translation is submitted now in order to supplement the understanding of the cited references which are being disclosed in the instant Information Disclosure Statement.

English language translation of the following: Office action dated Dec. 26, 2022 from the SIPO in a Chinese patent application No. 201880061871.0 corresponding to the instant patent application. This office action translation is submitted now in order to supplement the understanding of the cited references which are being disclosed in the instant Information Disclosure Statement.

English language translation of the following: Office action dated Aug. 17, 2021 from the JPO in a Japanese patent application No. 2019-544495 corresponding to the instant patent application. This office action translation is submitted now in order to supplement the understanding of the cited references which are being disclosed in the instant Information Disclosure Statement.

English language translation of the following: Office action dated Aug. 20, 2021 from the KIPO in a Korean patent application No. 10-2020-7007017 corresponding to the instant patent application. This office action translation is submitted now in order to supplement the understanding of the cited reference which is being disclosed in the instant Information Disclosure Statement.

International Search Report issued in International Application No. PCT/JP2018/032925 dated Dec. 4, 2018.

Written Opinion of the ISA issued in International Application No. PCT/JP2018/032925 dated Dec. 4, 2018.

English language translation of the following: Office action dated Aug. 9, 2022 from the JPO in a Japanese patent application No. 2019-544495 corresponding to the instant patent application.

Extended European Search Report dated Oct. 30, 2020, issued in corresponding EP Patent Application No. 18860591.9.

English language translation of the following: Office action dated Jul. 13, 2022 from the KIPO in a Korean patent application No. 10-2022-7013732 corresponding to the instant patent application. This office action translation is submitted now in order to supplement the understanding of the cited references which are being disclosed in the instant Information Disclosure Statement.

English language translation of the following: Office action dated Aug. 18, 2023 from the SIPO in a Chinese patent application No. 201880061871.0 corresponding to the instant patent application.

English language translation of the following: Office action dated Oct. 10, 2023 from the JPO in a Japanese patent application No. 2022-139570 corresponding to the instant patent application. This office action translation is submitted now in order to supplement the understanding of the cited reference which is being disclosed in the instant Information Disclosure Statement.

English language translation of the following: Decision of Refusal dated Jan. 4, 2024 from the SIPO in a Chinese patent application No. 201880061871.0 corresponding to the instant patent application.

\* cited by examiner

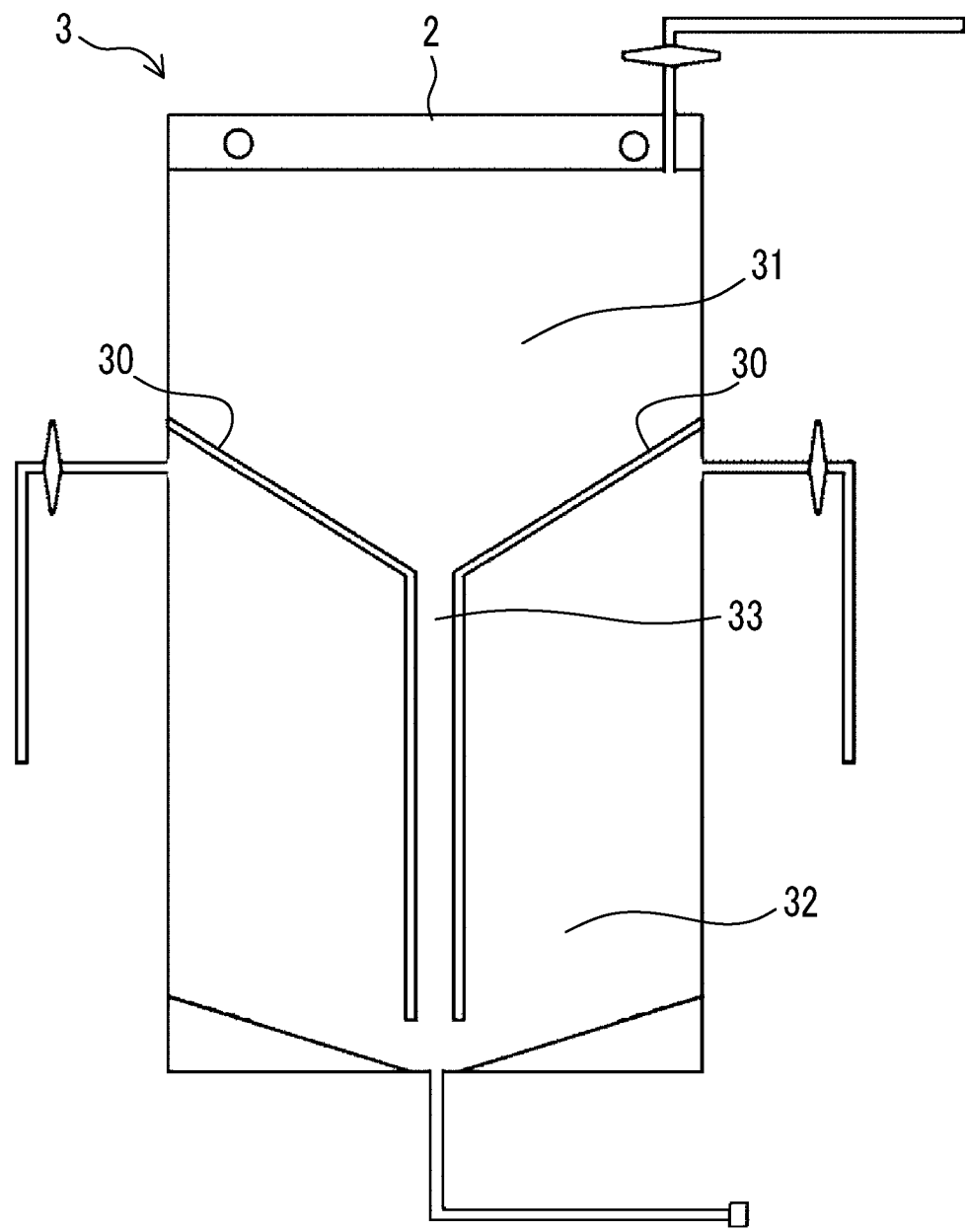

US 11,939,096 B2

BAG GRIPPING CLIP, CONTAINER, AND STIRRING METHOD

CROSS-REFERENCE TO RELATED APPLICATION

This application is a continuation application of International Application No. PCT/JP2018/032925, filed Sep. 5, 2018, the disclosure of which is incorporated herein by reference in its entirety. Further, this application claims priority from Japanese Patent Application No. 2017-184952 filed on Sep. 26, 2017, the disclosure of which is incorporated herein by reference in its entirety.

BACKGROUND

1. Technical Field

The disclosed technique relates to a bag gripping clip, a container, and a stirring method.

2. Description of the Related Art

The following techniques are known as techniques relating to cell culture bags. For example, JP2011-239734A discloses that a culture container is divided into two chambers, which are a culture part and an expandable part, by a partition member, a position of the partition member is transferred as the number of cells increases, and a volume of the culture part is enlarged.

SUMMARY

In suspension culture in which cells are cultured in a state of being suspended in a medium, it is necessary to distribute nutrients and gas required for cell proliferation to all cells. For this reason, it is preferable that the cells be uniformly dispersed in the medium.

As a method for uniformly dispersing cells in a medium, a method of stirring a cell suspension using a stirring blade is known. However, the cells are fragile and may be damaged by physical stress caused by the stirring blade, and this may reduce a cell survival rate.

As another method for uniformly dispersing cells in a medium, rocking stirring in which a bag accommodating the cells together with the medium is rocked is known. A stirring method using rocking stirring is more difficult to establish operating conditions because a flow state of a cell suspension changes more drastically compared to the stirring using a stirring blade.

In addition, as another method for uniformly dispersing cells in a medium, a method in which a cell suspension in a bag is fluidized to be stirred by applying pressure to the cell suspension accommodated inside the bag is also considered. However, in this case, in the bag, it is necessary to provide a structure such as a partition that can form a pressure difference in the bag. In a case where the structure is provided in the bag, and in a case where cells are discharged to the outside of the bag, the structure hinders the discharge thereof, the cells remain in the bag, and thereby a cell recovery rate may decrease.

In one embodiment of the present invention, a decrease in cell recovery rate in a process of stirring a cell suspension is inhibited.

A bag gripping clip according to the disclosed technique is a bag gripping clip, in which, in a case where a bag that forms an accommodation space between a first film and a second film facing the first film is gripped by the clip, a pressing force for bringing the first film and the second film into partially close contact with each other is applied to the bag, and a partition that divides the accommodation space into a plurality of spaces communicating with each other via a communication part is formed.

The partition may extend in a direction crossing a first side and a second side of the bag between the first side and the second side facing the first side, or a communication part may be provided on a path along which the partition extends.

The communication part may be provided between the partition and the first side or between the partition and the second side.

The bag gripping clip according to the disclosed technique is preferably attachable to and detachable from the bag.

The partition may divide the accommodation space into a first space, and a second space disposed below the first space in a vertical direction.

The partition may form a downward slope at a bottom part of the first space, and may form the communication part of which one end is connected to a lowest position of the bottom part and which extends into the second space.

The bag gripping clip according to the disclosed technique may further comprise an abutting part that abuts on the bag and is made of an elastic body, and may further comprise a support member that supports the abutting part.

The pressing force for bringing the first film and the second film into partially close contact with each other may be applied by a magnetic force.

The bag gripping clip according to the disclosed technique may further comprise a first abutting part that abuts on the first film; a second abutting part that abuts on a portion of the first film, which is different from a portion on which the first abutting part abuts; a third abutting part that abuts on the second film and sandwiches the bag between the first abutting part and the third abutting part to form one part of the partition separating the first space and the second space, and one part of the partition forming the communication part; and a fourth abutting part that abuts on the second film and sandwiches the bag between the second abutting part and the fourth abutting to form the other part of the partition separating the first space and the second space, and the other part of the partition forming the communication part.

The bag gripping clip according to the disclosed technique may further comprise a first fixing part that fixes a relative position between the first abutting part and the second abutting part; and a second fixing part that fixes a relative position between the third abutting part and the fourth abutting part.

The bag gripping clip according to the disclosed technique may further comprise a first sliding mechanism for changing a relative position between the first abutting part and the second abutting part by sliding at least one of the first abutting part or the second abutting part; and a second sliding mechanism for changing a relative position between the third abutting part and the fourth abutting part by sliding at least one of the third abutting part or the fourth abutting part.

A container according to the disclosed technique comprises: the above-described bag gripping clip; and a bag gripped by the bag gripping clip.

The container according to the disclosed technique may further comprise a ventilation port that is connected to each of the plurality of spaces.

A stirring method according to the disclosed technique which is for stirring a cell suspension using a container including a bag gripping clip in which, in a case where a bag that forms an accommodation space between a first film and a second film facing the first film is gripped by the clip, a pressing force for bringing the first film and the second film into partially close contact with each other is applied to the bag, and a partition that divides the accommodation space into a first space and a second space which communicate with each other via a communication part is formed; and a bag gripped by the bag gripping clip, the stirring method comprising: a first step of gripping the bag by the bag gripping clip; a second step of accommodating a cell suspension in the second space after the first step; and a third step of forming an air pressure difference between the first space and the second space to transfer the cell suspension accommodated in the second space to the first space via the communication part.

The stirring method according to the disclosed technique may further comprise a fourth step of transferring the cell suspension accommodated in the first space to the second space via the communication part after the third step. In addition, the third step and the fourth step may be alternately and repeatedly performed.

The stirring method according to the disclosed technique may further comprise a fifth step of detaching the bag gripping clip from the bag in a state in which the cell suspension is accommodated inside the bag; and a sixth step of discharging the cell suspension accommodated inside the bag to the outside of the bag after the fifth step.

A container according to the disclosed technique comprises, inside thereof, an openable and closable zip mechanism for bringing a first film and a second film which face each other into partially close contact with each other, in which, by closing the zip mechanism, a partition that divides an accommodation space inside the container into a plurality of spaces communicating with each other via a communication part is formed.

According to one embodiment of the present invention, it is possible to inhibit a decrease in cell recovery rate in a process of stirring a cell suspension.

BRIEF DESCRIPTION OF THE DRAWINGS

Exemplary embodiments according to the technique of the present disclosure will be described in detail based on the following figures, wherein:

FIG. 5B is a view showing an example of a stirring method according to an embodiment of the disclosed technique;

DETAILED DESCRIPTION

Figure 1:
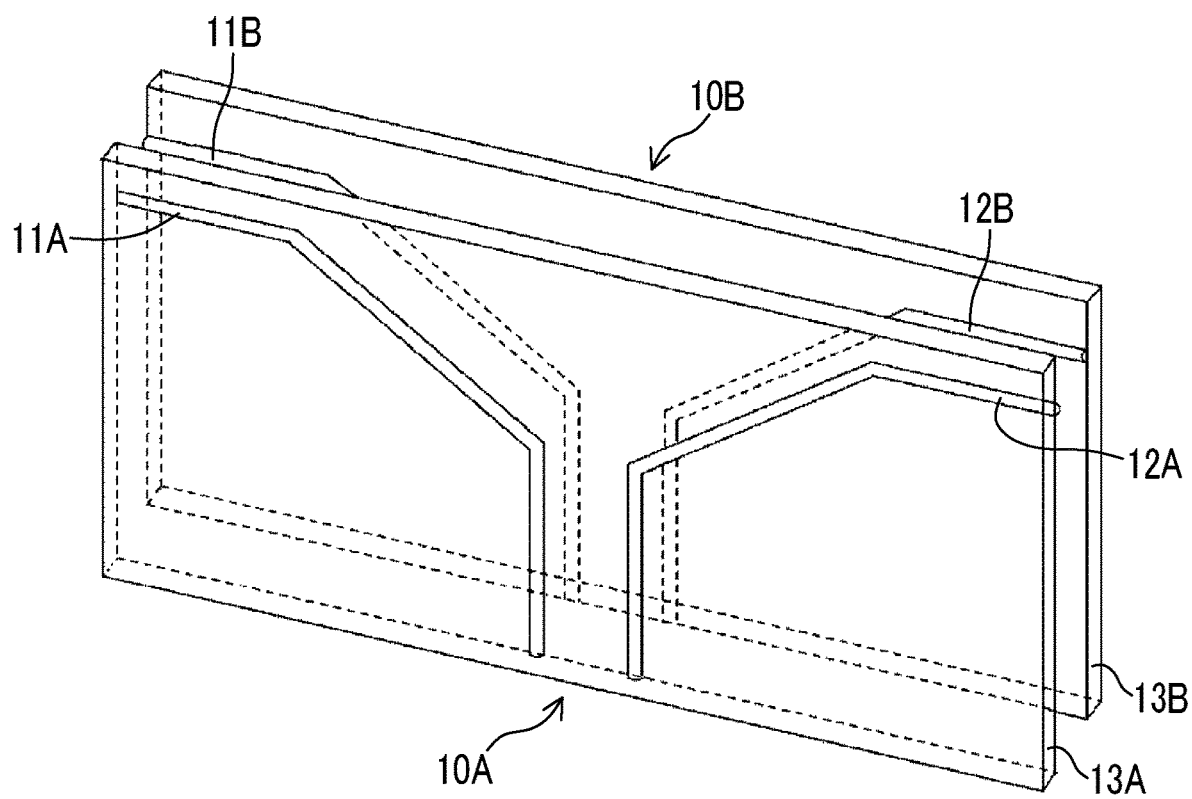
FIG. 1 is a perspective view schematically showing an example of a configuration of a bag gripping clip according to an embodiment of the disclosed technique.

Hereinafter, embodiments of the disclosed technique will be described with reference to the drawings. In the drawings, substantially the same or equivalent components or parts are denoted by the same reference numerals.

First Embodiment

Figure 2:
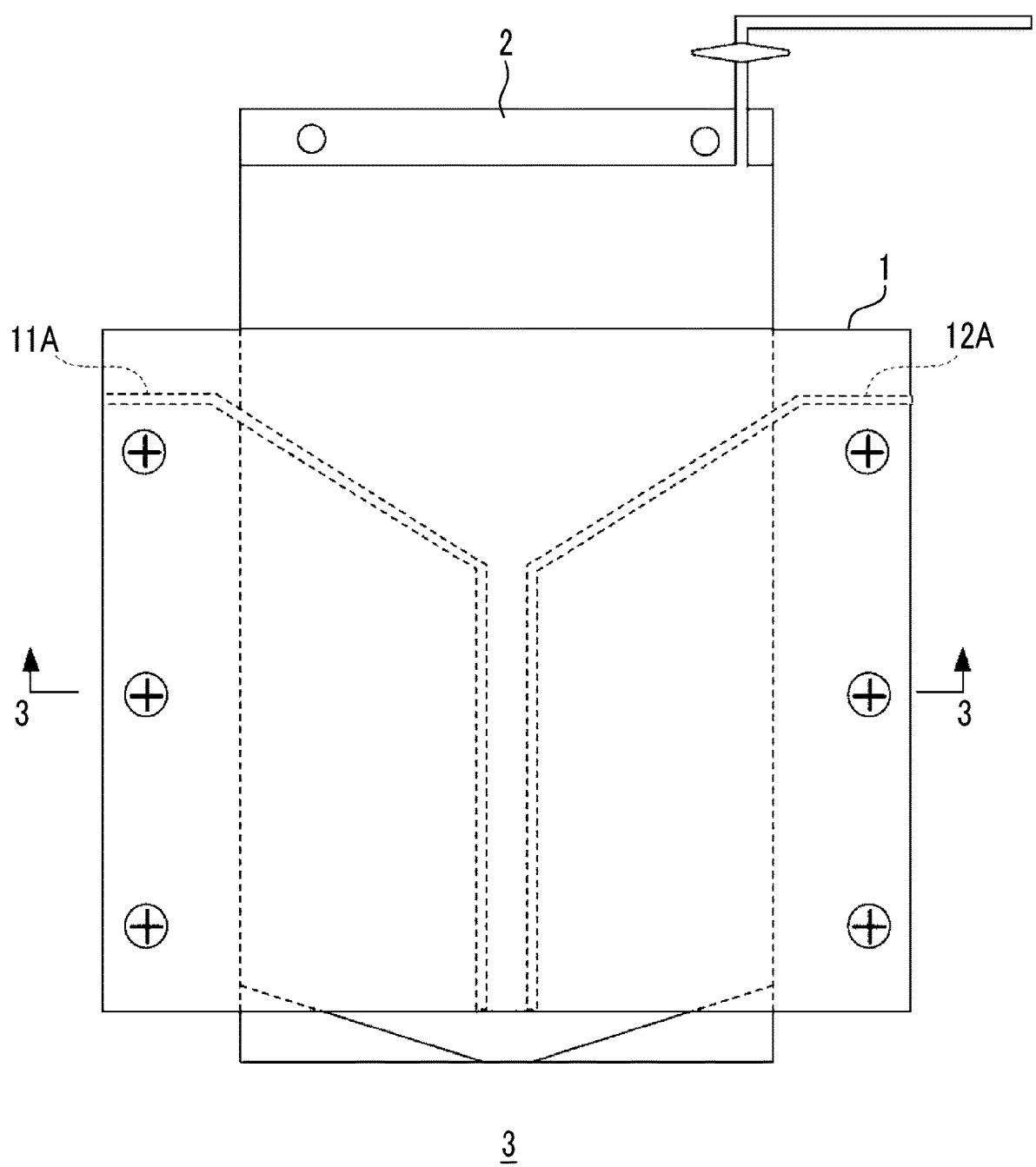
FIG. 2 is a front view showing an example of a configuration of a stirring container according to an embodiment of the disclosed technique.
Figure 3:
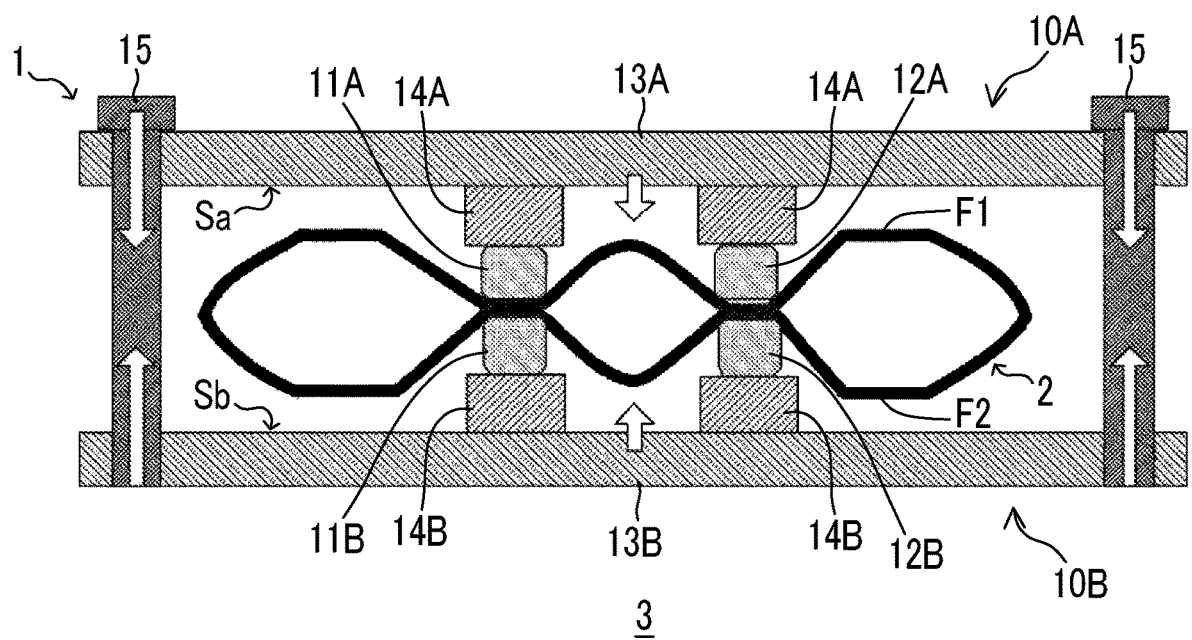
FIG. 3 is a cross-sectional view taken along line 3-3 in FIG. 2.

FIG. 1 is a perspective view schematically showing an example of a configuration of a bag gripping clip 1 according to an embodiment of the disclosed technique. FIG. 2 is a front view showing an example of a configuration of a stirring container 3 according to an embodiment of the disclosed technique, which includes the bag gripping clip 1 and a bag 2 gripped by the bag gripping clip 1. FIG. 3 is a cross-sectional view taken along line 3-3 in FIG. 2.

The bag 2 can be used, for example, for cell culture, and has a configuration in which a first film F1 and a second film F2 each having flexibility and gas permeability are attached by a technique such as heat gripping (thermocompression bonding). The bag 2 may be configured by folding a single film, and also in this case, portions of the film which face each other are respectively the first film F1 and the second film F2.

As a material constituting the first film F1 and the second film F2, for example, a plastic such as polyethylene or polypropylene can be suitably used. The bag 2 forms an accommodation space for accommodating cells together with a medium between the first film F1 and the second film F2.

The bag gripping clip 1 is configured to include a first portion 10A disposed on the first film F1 side, and a second portion 10B disposed on the second film F2 side, and the bag 2 is gripped by sandwiching the bag 2 between the first portion 10A and the second portion 10B. In other words, the bag gripping clip 1 grips the bag 2 by applying a pressing force from the first film F1 side and the second film F2 side of the bag 2 to the other side. The bag gripping clip 1 is attachable to and detachable from the bag 2.

The first portion 10A of the bag gripping clip 1 has a linear first abutting part 11A that abuts on the first film F1, a linear second abutting part 12A that abuts on a portion of the first film F1, which is different from a portion on which the first abutting part 11A abuts, and a support plate 13A constituting a support member that supports the first abutting part 11A and the second abutting part 12A. The first abutting part 11A and the second abutting part 12A are attached to a gripping surface Sa (refer to FIG. 3) which is a surface of the support plate 13A on which the bag 2 is disposed.

Similarly, a second portion 10B of the bag gripping clip 1 has a linear third abutting part 11B that abuts on the second film F2, a linear fourth abutting part 12B that abuts on a portion different from a portion of the second film F2 on which the third abutting part 11B abuts, and a support plate 13B constituting a support member that supports the third abutting part 11B and the fourth abutting part 12B. The third abutting part 11B and the fourth abutting part 12B are attached to a gripping surface Sb (refer to FIG. 3) which is a surface of the support plate 13B on which the bag 2 is disposed.

As shown in FIG. 3, in the state where the bag gripping clip 1 grips the bag 2, the first abutting part 11A and the third abutting part 11B overlap each other, and the second abutting part 12A and the fourth abutting part 12B overlap each other. That is, the bag 2 is sandwiched between the first abutting part 11A and the third abutting part 11B and between the second abutting part 12A and the fourth abutting part 12B. In a case where the bag 2 is sandwiched between the first abutting part 11A and the third abutting part 11B, the first film F1 and the second film F2 are brought into partially (linearly) close contact with each other according to the shape of the first abutting part 11A and the third abutting part 11B, and thereby a linear partition is formed inside the bag 2. Similarly, in a case where the bag 2 is sandwiched between the second abutting part 12A and the fourth abutting part 12B, the first film F1 and the second film F2 are brought into partially (linearly) close contact with each other according to the shape of the second abutting part 12A and the fourth abutting part 12B, and thereby a linear partition is formed inside the bag 2. The first abutting part 11A, the second abutting part 12A, the third abutting part 11B, and the fourth abutting part 12B may each be made of an elastic body such as rubber. With this configuration, in a case where the bag 2 is gripped by the bag gripping clip 1, it is possible to improve adhesiveness between the first film F1 and the second film F2 at portions on which respective abutting parts abut, and a function as a partition is effectively exhibited.

As shown in FIG. 3, the first abutting part 11A and the second abutting part 12A are respectively attached to the support plate 13A via a spacer 14A, and the third abutting part 11B and the fourth abutting part 12B are respectively attached to the support plate 13B via a spacer 14B. By providing the spacers 14A and 14B, it is possible to secure a sufficient space between the support plate 13A and the support plate 13B to dispose the bag 2 in a state where cells are accommodated together with a medium.

Relative positions of the first portion 10A and the second portion 10B of the bag gripping clip 1 are fixed by a plurality of screws 15 penetrating the support plate 13A and the support plate 13B. In addition, in portions of the bag 2 on which respective abutting parts abut with the plurality of screws 15, a pressing force for bringing the first film F1 and the second film F2 into partially (linearly) close contact with each other is applied. That is, a pressing force for bringing the first film F1 and the second film F2 into partially (linearly) close contact with each other is applied by tensile elastic force acting by the plurality of screws 15. An uneven structure for positioning relative positions of the first portion 10A and the second portion 10B may be provided in the vicinity of the screw 15 of the support plate 13A and the support plate 13B.

Figure 4:
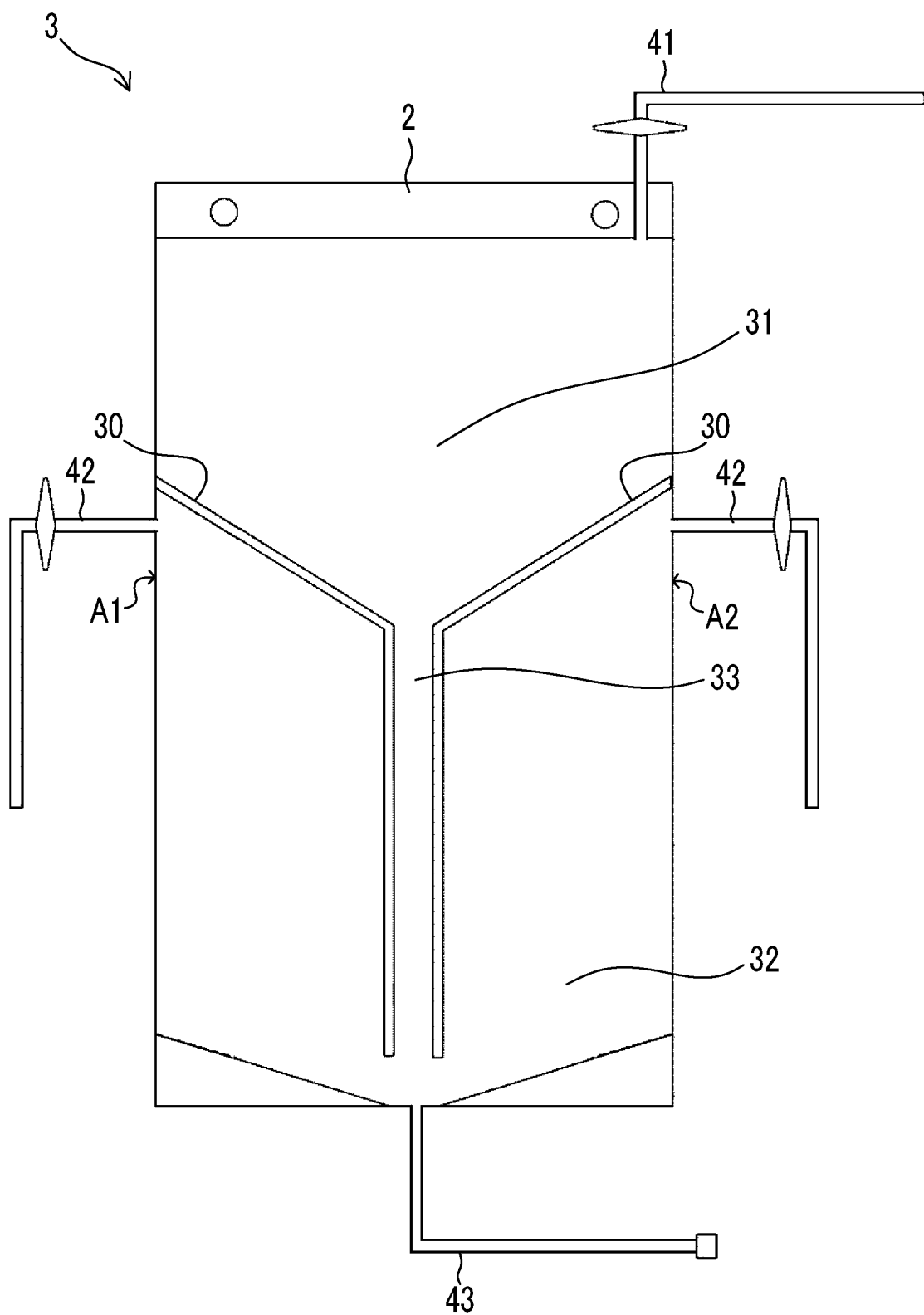
FIG. 4 is a view showing an example of an internal configuration of a stirring container according to an embodiment of the disclosed technique.

FIG. 4 is a front view showing an example of an embodiment of a partition 30 formed inside the bag 2 by gripping the bag 2 by the bag gripping clip 1, and is a view showing an example of the internal configuration of a stirring container 3. The partition 30 is formed at a portion at which the first film F1 and the second film F2 of the bag 2 gripped by the bag gripping clip 1 are brought into close contact with each other.

By the partition 30, an accommodation space inside the bag 2 is divided into a first space 31 and a second space 32. In a case where a cell suspension in which cells are dispersed in a medium is stirred using the stirring container 3 configured to include the bag gripping clip 1 and the bag 2, the second space 32 is disposed below the first space 31 in a vertical direction. In addition, the partition 30 forms a communication part 33 that allows the first space 31 and the second space 32 to communicate with each other. That is, the partition 30 has a portion extending in a cross direction crossing a side A1 and a side A2 between the side A1, which is the end of the bag 2 that is rectangular in a front view, and the side A2 which is the end of the other side of the bag 2 facing the side A1, and the communication part 33 is provided on an extension line of a portion extending in the cross direction of the partition 30. More specifically, the partition 30 forms a downward slope at a bottom part of the first space 31, and forms the communication part 33 of which one end is connected to a lowest position of the inclined bottom part of the first space 31 and which extends into the second space 32. The lowest position of the inclined bottom part of the first space 31 is disposed at the horizontal center between the side A1 and the side A2 of the bag 2, and accordingly, the communication part 33 is also disposed in the horizontal center between the side A1 and the side A2.

The bag 2 includes a ventilation port 41 connected to the first space 31 and a ventilation port 42 connected to the second space 32. It is possible to introduce gas into the bag 2 from the outside of the bag 2 through the ventilation ports 41 and 42. In addition, a liquid feeding port 43 is provided at the bottom part of the second space 32, and through the liquid feeding port 43, a cell suspension can be discharged from the inside of the bag 2, or a cell suspension can be injected into the bag 2. The bag 2 may include a plurality of liquid feeding ports having a liquid feeding port dedicated for injecting a cell suspension into the bag 2 and a liquid feeding port dedicated for discharging a cell suspension from the inside of the bag 2.

Hereinafter, a stirring method according to an embodiment of the disclosed technique in which a cell suspension is stirred using the stirring container 3 will be described with reference to FIGS. 5A to 5F. FIGS. 5B to 5E show the partition 30 formed inside the bag 2 by gripping the bag 2 by the bag gripping clip 1, and the illustration of the bag gripping clip 1 is omitted.

Figure 5A:
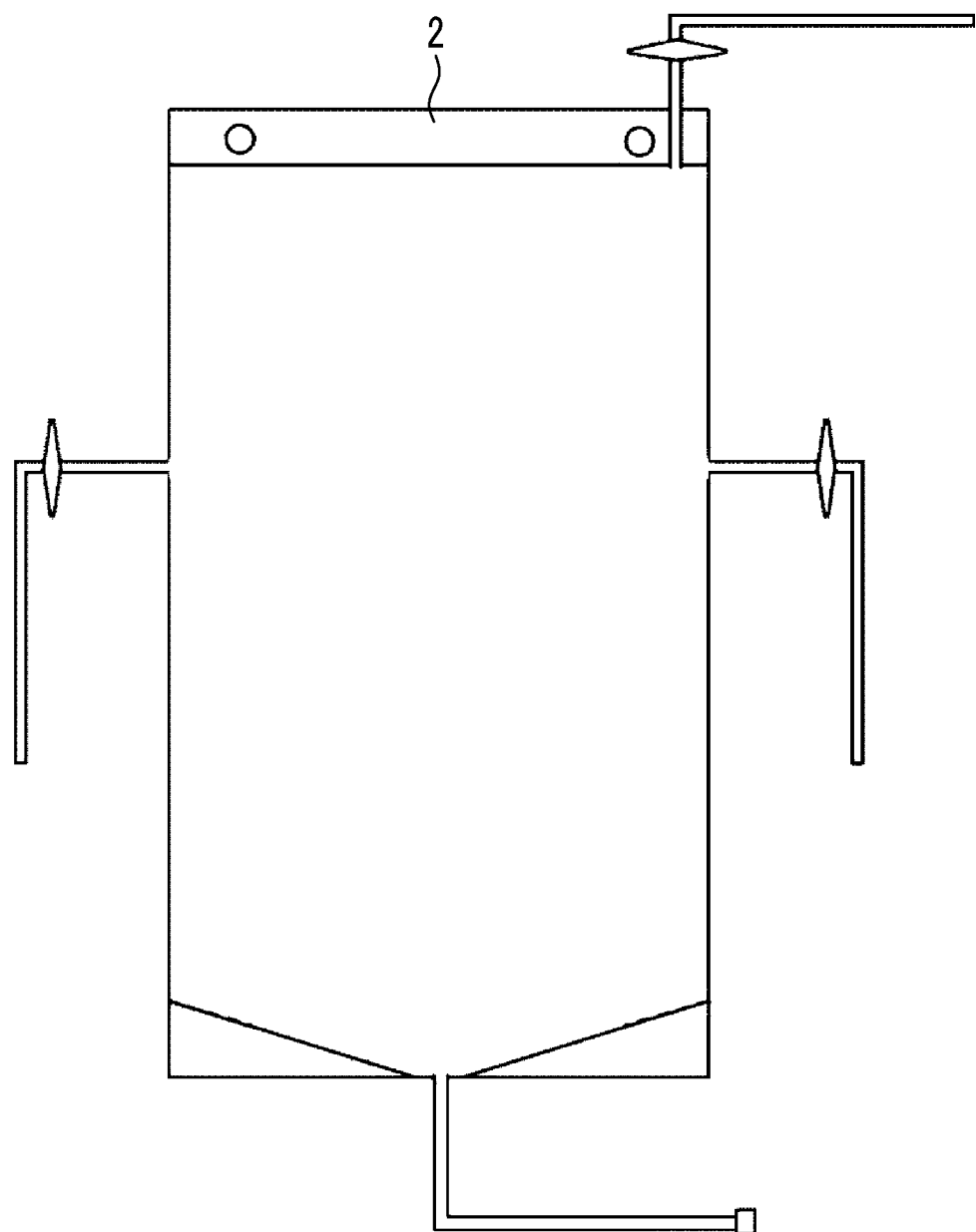
FIG. 5A is a view showing an example of a stirring method according to an embodiment of the disclosed technique.

First, the bag 2 in which a cell suspension is not accommodated is prepared (FIG. 5A). Next, the bag 2 is gripped by the bag gripping clip 1 (FIG. 5B). That is, the bag 2 is sandwiched between the first portion 10A and the second portion 10B of the bag gripping clip 1, and the screw 15 is tightened. Thereby, a pressing force for bringing the first film F1 and the second film F2 of the bag 2 into partially (linearly) close contact with each other at the first abutting part 11A, the second abutting part 12A, the third abutting part 11B, and the fourth abutting part 12B is applied. By gripping the bag 2 by the bag gripping clip 1, the partition 30 is formed inside the bag 2, and by this partition 30, the accommodation space inside the bag 2 is divided into the first space 31 and the second space 32 communicating with each other via the communication part 33. The stirring container 3 is configured by gripping the bag 2 by the bag gripping clip 1.

Figure 5C:
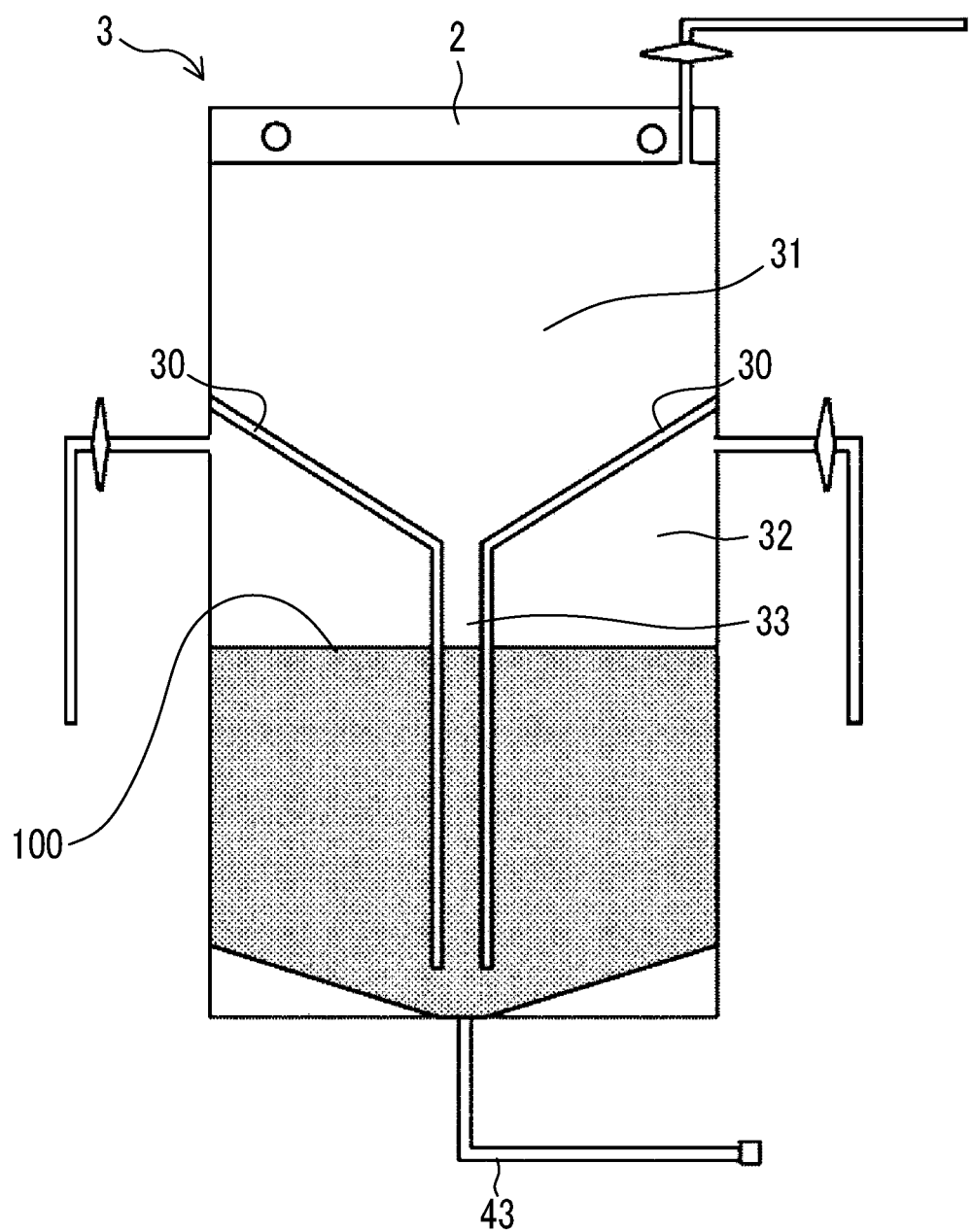
FIG. 5C is a view showing an example of a stirring method according to an embodiment of the disclosed technique.

Next, a direction of the stirring container 3 is fixed so that the second space 32 of the stirring container 3 is positioned below the first space 31 in the vertical direction, and a cell suspension 100 is injected inside the bag 2 via the liquid feeding port 43 (FIG. 5C). The cell suspension 100 is accommodated in the second space 32 of the stirring container 3. An amount of the cell suspension 100 injected into the bag 2 preferably smaller than a volume of the second space 32 so that the entire second space 32 is not filled with the cell suspension 100.

Figure 5D:
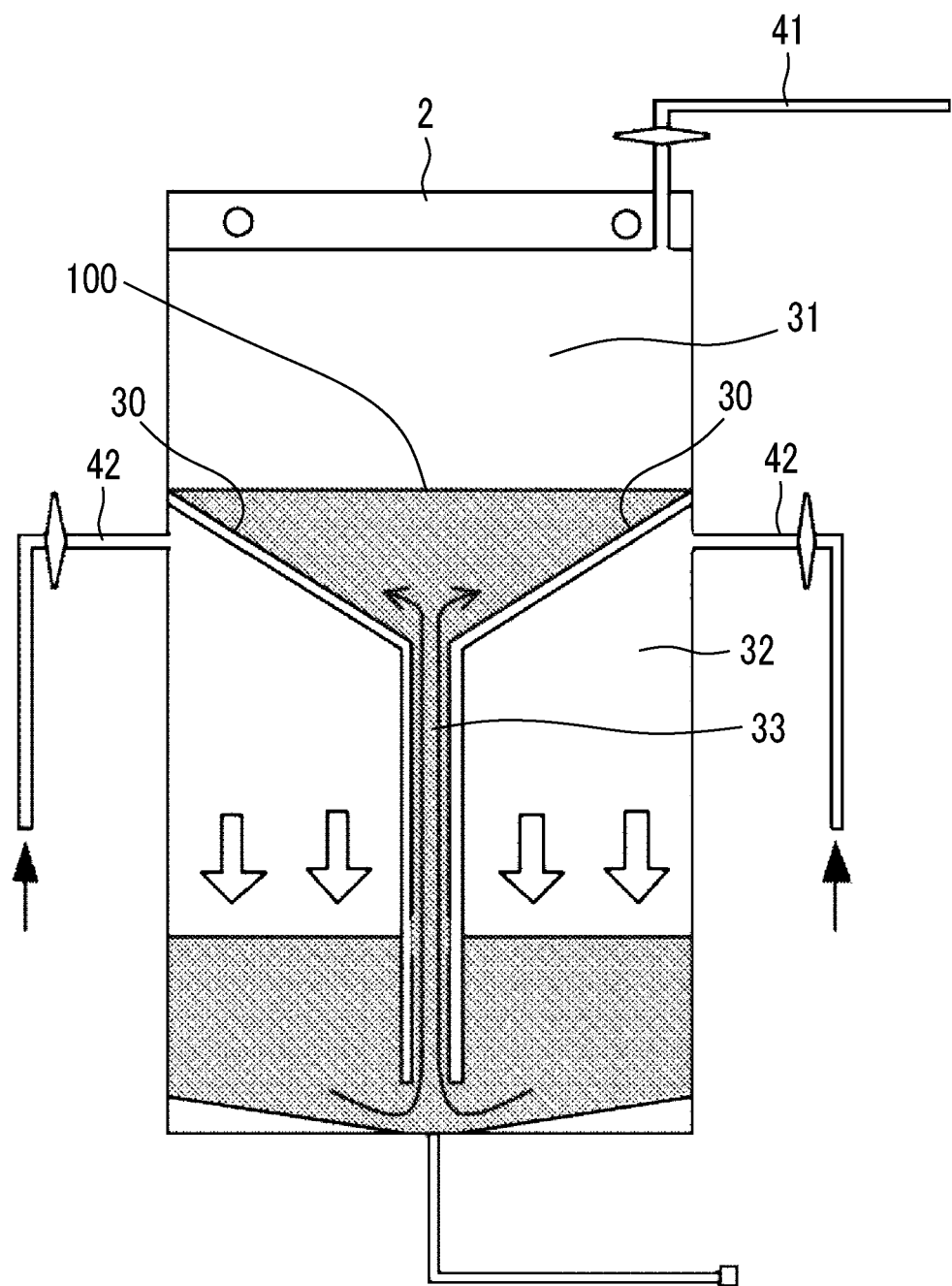
FIG. 5D is a view showing an example of a stirring method according to an embodiment of the disclosed technique.

Next, a gas is introduced into the second space 32 through the ventilation port 42 connected to the second space 32 while the ventilation port 41 connected to the first space 31 is opened. Accordingly, air pressure inside the second space 32 becomes higher than air pressure inside the first space 31. As a result, a liquid surface of the cell suspension 100 accommodated in the second space 32 is pressurized and transferred to the first space 31 via the communication part 33. The cell suspension 100 is stirred by transferring the cell suspension 100 to the first space 31 via the communication part 33 (FIG. 5D).

The gas introduced into the bag 2 is preferably in a sterile state so that the cells are not contaminated. As the gas introduced into the bag 2, it is preferable to use a gas that is harmless to cells such as oxygen or air. In addition, in the above description, the case where the cell suspension 100 is transferred from the second space 32 to the first space 31 by pressurizing the inside of the second space 32 is exemplified, but the present invention is not limited thereto. That is, the transfer of the cell suspension 100 from the second space 32 to the first space 31 may be performed by sucking the gas inside the first space 31 through the ventilation port 41, and decompressing the inside of the first space 31.

Figure 5E:
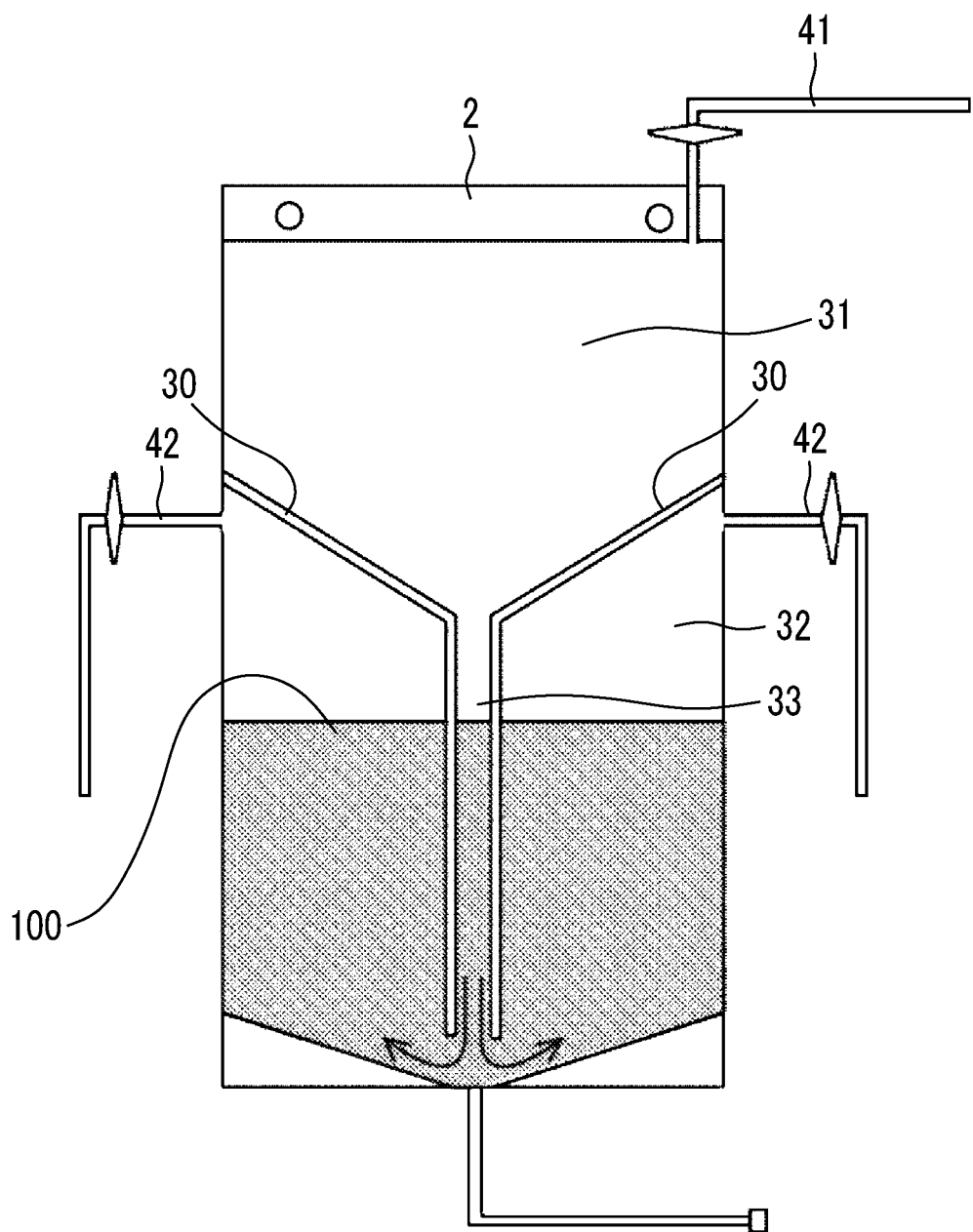
FIG. 5E is a view showing an example of a stirring method according to an embodiment of the disclosed technique.

Next, the ventilation port 42 connected to the second space 32 is opened. Thereby, the cell suspension 100 accommodated in the first space 31 is transferred to the second space 32 via the communication part 33 by gravity (FIG. 5E). The partition 30 forms a downward slope at the bottom part of the first space 31, and forms the communication part 33 at the lowest position of the inclined bottom part, and therefore the cell suspension 100 accommodated in the first space 31 can be guided to the communication part 33 by gravity. The cell suspension 100 is stirred by transferring the cell suspension 100 to the second space 32 via the communication part 33. In addition, the transfer of the cell suspension 100 from the first space 31 to the second space 32 may be promoted by introducing a gas into the first space 31 via the ventilation port 41 connected to the first space 31.

Thereafter, if necessary, the transfer of the cell suspension 100 from the second space 32 to the first space 31, and the transfer of the cell suspension 100 from the first space 31 to the second space 32 may be repeated several times. The transfer of the cell suspension 100 is preferably performed repeatedly until cells are substantially uniformly dispersed in a medium.

Figure 5F:
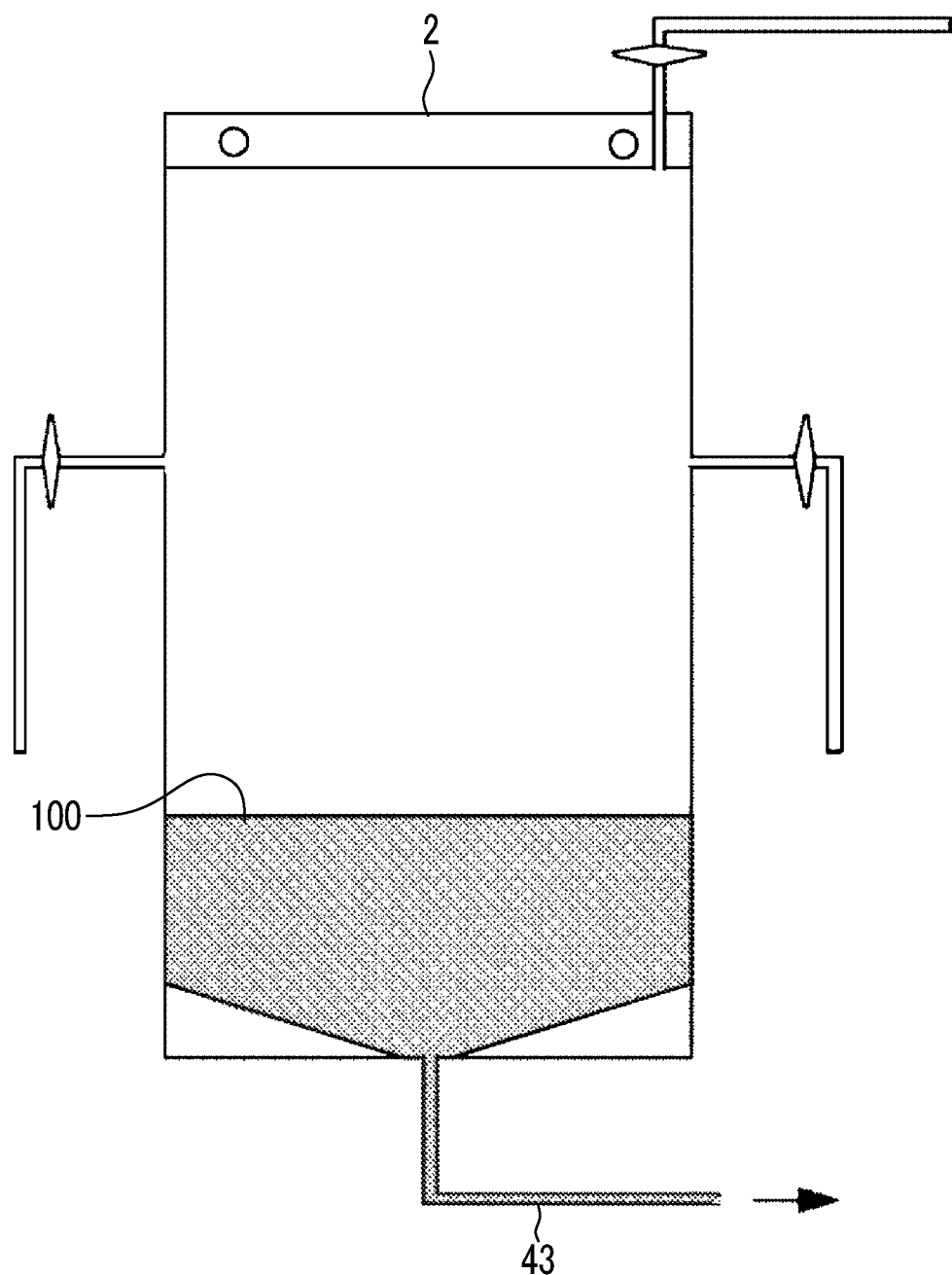
FIG. 5F is a view showing an example of a stirring method according to an embodiment of the disclosed technique.

Next, the bag gripping clip 1 is detached from the bag 2. Thereby, the partition 30 that separates the first space 31 and the second space 32 is removed. Thereafter, the cell suspension 100 accommodated inside the bag 2 is discharged from the liquid feeding port 43 to the outside of the bag 2 (FIG. 5F). Cell culture may be performed in the bag 2 after the bag gripping clip 1 is detached from the bag 2.

As described above, in a case where the bag gripping clip 1 according to the embodiment of the disclosed technique grips the bag 2, a pressing force for bringing the first film F1 and the second film F2 of the bag 2 into partially (linearly) close contact with each other is applied, thereby forming the partition 30 that divides the accommodation space of the bag 2 into the first space 31 and the second space 32 communicating with each other via the communication part 33. In addition, the stirring method according to the embodiment of the disclosed technique is a method in which the cell suspension is introduced into the bag 2 after the bag 2 is gripped by the bag gripping clip 1, and using a pressure difference between the first space 31 and the second space 32 or gravity, the cell suspension is stirred by fluidizing the cell suspension between the first space 31 and the second space 32. As described above, according to the system in which a cell suspension is flowed by the pressure difference or gravity to be stirred, damage to the cells can be reduced as compared with a system using a stirring blade. In order to more reliably inhibit damage to the cells, it is preferable to strictly control pressure for pressurizing a liquid surface using a pump or the like.

In addition, according to the stirring method according to the embodiment of the disclosed technique, cells can be uniformly dispersed in a medium, as in the method using a stirring blade. Furthermore, after the stirring process, in a case where the bag gripping clip 1 is detached from the bag 2, the partition 30 inside the bag 2 is removed, and thereby a cell suspension is discharged to the outside of the bag 2, a structure that hinders the discharge is removed, and thereby it is possible to prevent cells from remaining inside the bag 2. Accordingly, a decrease in cell recovery rate can be inhibited.

The stirring method according to the present embodiment may be used for the purpose of mixing cells and a medium at a predetermined timing during a culture period in, for example, static culture in which cells are left in a suspended state in a medium. Thereby, a dispersed state of the cells dispersed in the medium is improved, and a preferable culture environment in which nutrients and gas are distributed evenly to all cells can be formed.

Figure 6A:
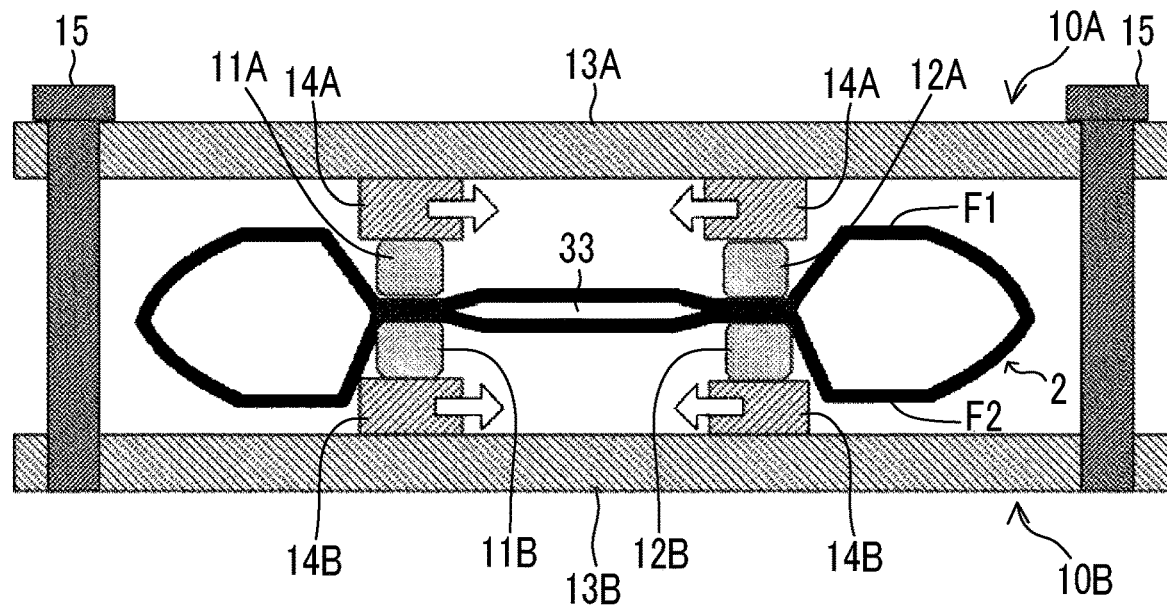
FIG. 6A is a cross-sectional view showing an example of a configuration of a stirring container according to an embodiment of the disclosed technique.
Figure 6B:
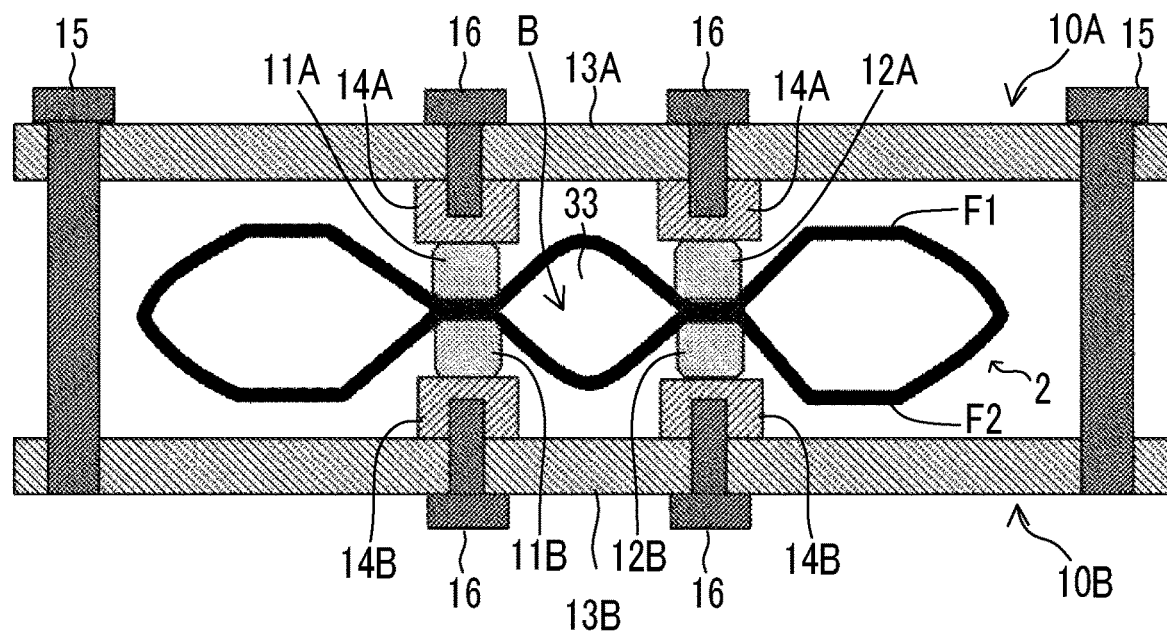
FIG. 6B is a cross-sectional view showing an example of a configuration of a stirring container according to an embodiment of the disclosed technique.

In a case of attaching the bag gripping clip 1 to the bag 2, the following operation may be performed in the communication part 33 in order to promote formation of a space through which a cell suspension flows. FIGS. 6A and 6B referred to in the following description are cross-sectional views showing an example of a configuration of the stirring container 3, and show a cross section corresponding to the cross section shown in FIG. 3.

As shown in FIG. 6A, the screw 15 is temporarily tightened in a case where the bag 2 is sandwiched between the first portion 10A and the second portion 10B of the bag gripping clip 1. The bag 2 is sandwiched between the first abutting part 11A and the third abutting part 11B, and between the second abutting part 12A and the fourth abutting part 12B.

Next, in a state where the bag 2 is sandwiched between the first abutting part 11A and the third abutting part 11B, and between the second abutting part 12A and the fourth abutting part 12B, the first abutting part 11A and the second abutting part 12A are slid in a direction in which they approach each other, and the third abutting part 11B and the fourth abutting part 12B are slid in a direction in which they approach each other.

As a result, as shown in FIG. 6B, in the bag 2, in a region between a portion sandwiched between the first abutting part 11A and the third abutting part 11B, and a portion sandwiched between the second abutting part 12A and the fourth abutting part 12B, the first film F1 and the second film F2 are respectively bent to swell outside the bag 2. As a result, a space B in which the cell suspension flows is formed in the communication part 33. One of the first abutting part 11A and the second abutting part 12A is slid in a direction in which they approach each other, and among the third abutting part 11B and the fourth abutting part 12B, one facing the one slid among the first abutting part 11A and the second abutting part 12A may be slid in a direction in which they approach each other.

After the space B is formed in the communication part 33, positions of the first abutting part 11A and the second abutting part 12A are fixed with screws 16. Thereby, relative positions of the first abutting part 11A and the second abutting part 12A are fixed. Similarly, positions of the third abutting part 11B and the fourth abutting part 12B are fixed by the screws 16. Thereby, relative positions of the third abutting part 11B and the fourth abutting part 12B are fixed. Thereafter, the screws 15 are finally tightened.

In a case where the space B is formed in the communication part 33 as described above, the bag gripping clip 1 includes a first sliding mechanism for changing a relative position between the first abutting part 11A and the second abutting part 12A; a second sliding mechanism for changing a relative position between the third abutting part 11B and the fourth abutting part 12B; a first fixing part for fixing a relative position between the first abutting part 11A and the second abutting part 12A; and a second fixing part for fixing a relative position between the third abutting part 11B and the fourth abutting part 12B. The first and second sliding mechanisms may be configured to slide spacers 14A and 14B, to which the respective abutting parts are joined, together with the respective abutting parts. In addition, the first and second fixing parts may have the screws 16 that respectively fix the spacers 14A and 14B, to which the respective abutting parts are joined, to the support plates 13A and 13B.

In addition, in a case where the space B is formed in the communication part 33 in the above-described manner, it is necessary to secure an amount of gas or liquid corresponding to a volume of the space B in the bag 2 in advance, or to introduce an amount of gas or liquid corresponding to a volume of the space B from the outside of the bag 2 at the time of forming the space B. For example, in a case where the space B is formed, one of the ventilation ports 41 and 42 may be opened to introduce outside air into the bag 2 through the opened ventilation port. A gas introduced into the bag 2 is preferably in a sterile state from the viewpoint of preventing contamination. Furthermore, in a case where the bag 2 is cleaned in advance, a cleaning liquid used for cleaning may be left inside the bag 2.

Second Embodiment

Figure 7:
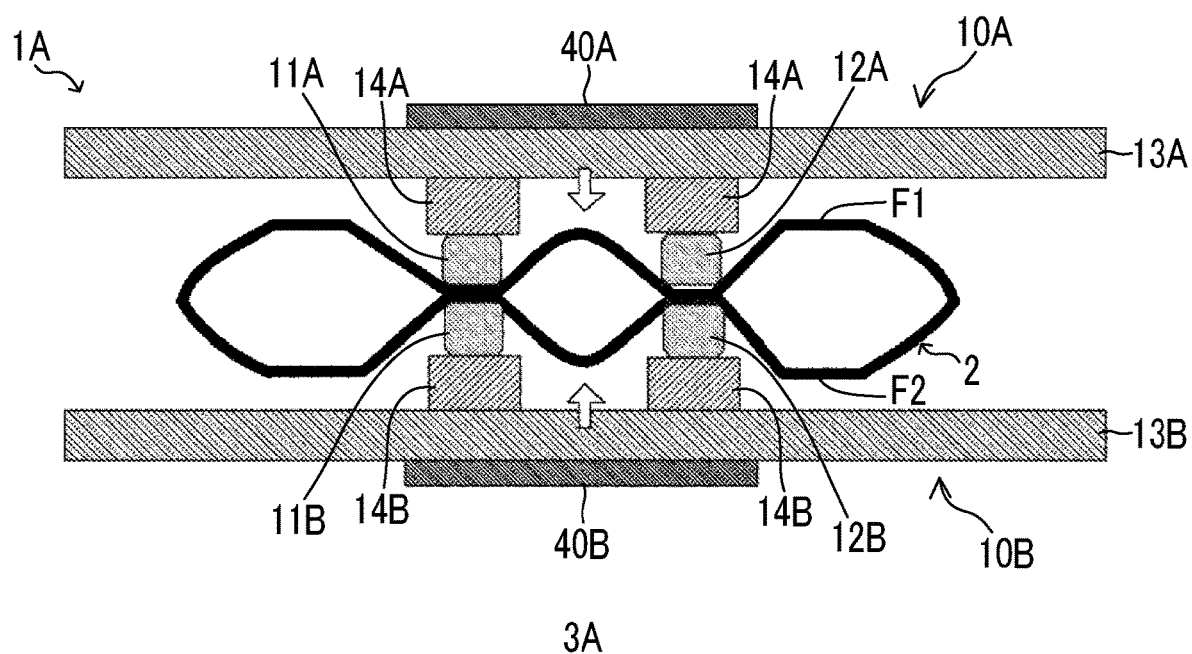
FIG. 7 is a cross-sectional view showing an example of a configuration of a stirring container according to another embodiment of the disclosed technique.

FIG. 7 is a cross-sectional view showing an example of a configuration of a stirring container 3A according to a second embodiment of the disclosed technique which includes a bag gripping clip 1A and a bag 2 gripped by the bag gripping clip 1A. FIG. 7 shows a cross section corresponding to the cross section shown in FIG. 3.

The above-described bag gripping clip 1 according to the first embodiment is a bag gripping clip in which a pressing force for bringing the first film F1 and the second film F2 into partially (linearly) close contact with each other is applied by tensile elastic force acting by the plurality of screws 15. On the other hand, the bag gripping clip 1A according to the second embodiment is a bag gripping clip in which a pressing force for bringing the first film F1 and the second film F2 into partially (linearly) close contact with each other is applied by a magnet 40A attached to the support plate 13A and a magnet 40B attached to the support plate 13B. The magnets 40A and 40B may be permanent magnets or electromagnets.

According to the bag gripping clip 1A according to the second embodiment, work burden in a case of attaching the bag gripping clip 1A to the bag 2 is reduced compared to the bag gripping clip 1 according to the first embodiment. In addition, by configuring the magnets 40A and 40B with electromagnets, generation of a magnetic force can be electrically controlled. For example, in a case where the bag gripping clip 1A is detached from the bag 2, detachment of the bag gripping clip 1A is facilitated by stopping the generation of a magnetic force. Furthermore, the first abutting part 11A, the second abutting part 12A, the third abutting part 11B, and the fourth abutting part 12B may be composed of a magnet. Furthermore, each of the spacers 14A and 14B may be composed of a magnet.

Third Embodiment

Figure 8:
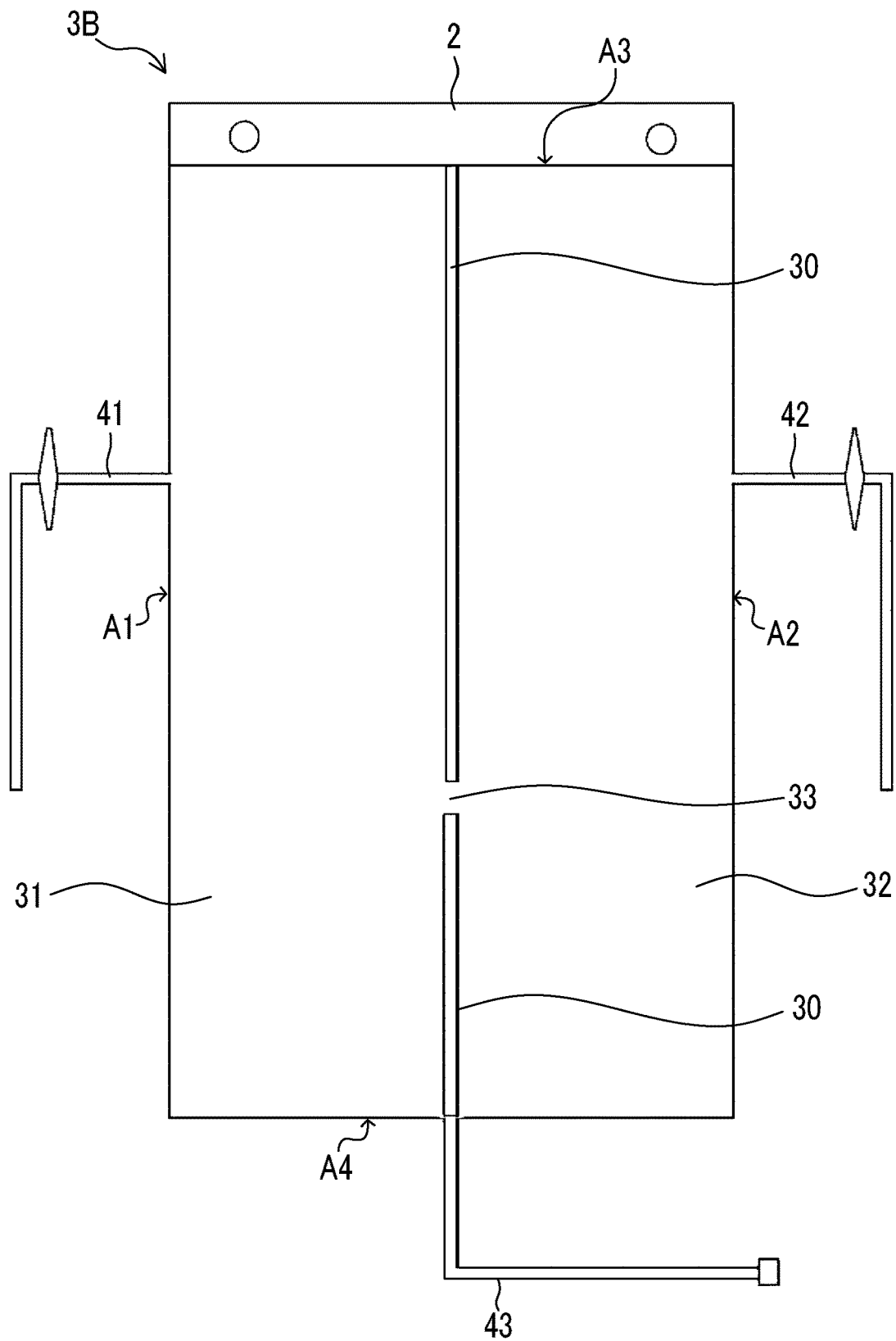
FIG. 8 is a view showing an example of an internal configuration of a stirring container according to another embodiment of the disclosed technique.

FIG. 8 is a plan view showing another embodiment of the partition 30 formed inside the bag 2 by gripping the bag 2 by a bag gripping clip (not shown), and is view showing an example of an internal configuration of a stirring container 3B according to a third embodiment of the disclosed technique. The bag gripping clip according to the present embodiment, which is not shown, includes an abutting part abuts on the bag 2 at a portion where the partition 30 shown in FIG. 8 is formed, and a support plate that supports the abutting part. The partition 30 is formed at a portion at which the first film F1 and the second film F2 of the bag 2 gripped by the bag gripping clip are brought into partially close contact with each other.

By the partition 30, an accommodation space inside the bag 2 is divided into a first space 31 and a second space 32. In a case where a cell suspension is stirred using the stirring container 3B, the first space 31 and the second space 32 are juxtaposed in a horizontal direction. In addition, the partition 30 forms a communication part 33 that allows the first space 31 and the second space 32 to communicate with each other. That is, in the stirring container 3B, the partition 30 has a portion extending in a cross direction crossing a side A3 and a side A4 between the side A3, which is the end of the bag 2 that is rectangular in a front view, and the side A4 which is the end of the other side of the bag 2 facing the side A3, and the communication part 33 is provided on an extension line of a portion extending in the cross direction of the partition 30. More specifically, the partition 30 has a portion extending linearly from the side A3 toward the side A4, and a portion extending linearly from the side A4 toward the side A3, and a gap between the two portions constitutes the communication part 33.

The bag 2 includes a ventilation port 41 connected to the first space 31 and a ventilation port 42 connected to the second space 32. It is possible to introduce gas into the bag 2 from the outside of the bag 2 through the ventilation ports 41 and 42. In addition, a liquid feeding port 43 is provided at the bottom part of the bag 2, and through the liquid feeding port 43, a cell suspension can be discharged from the inside of the bag 2, or a cell suspension can be injected into the bag 2.

Hereinafter, a stirring method according to an embodiment of the disclosed technique in which a cell suspension is stirred using the stirring container 3B will be described with reference to FIGS. 9A to 9F.

Figure 9A:
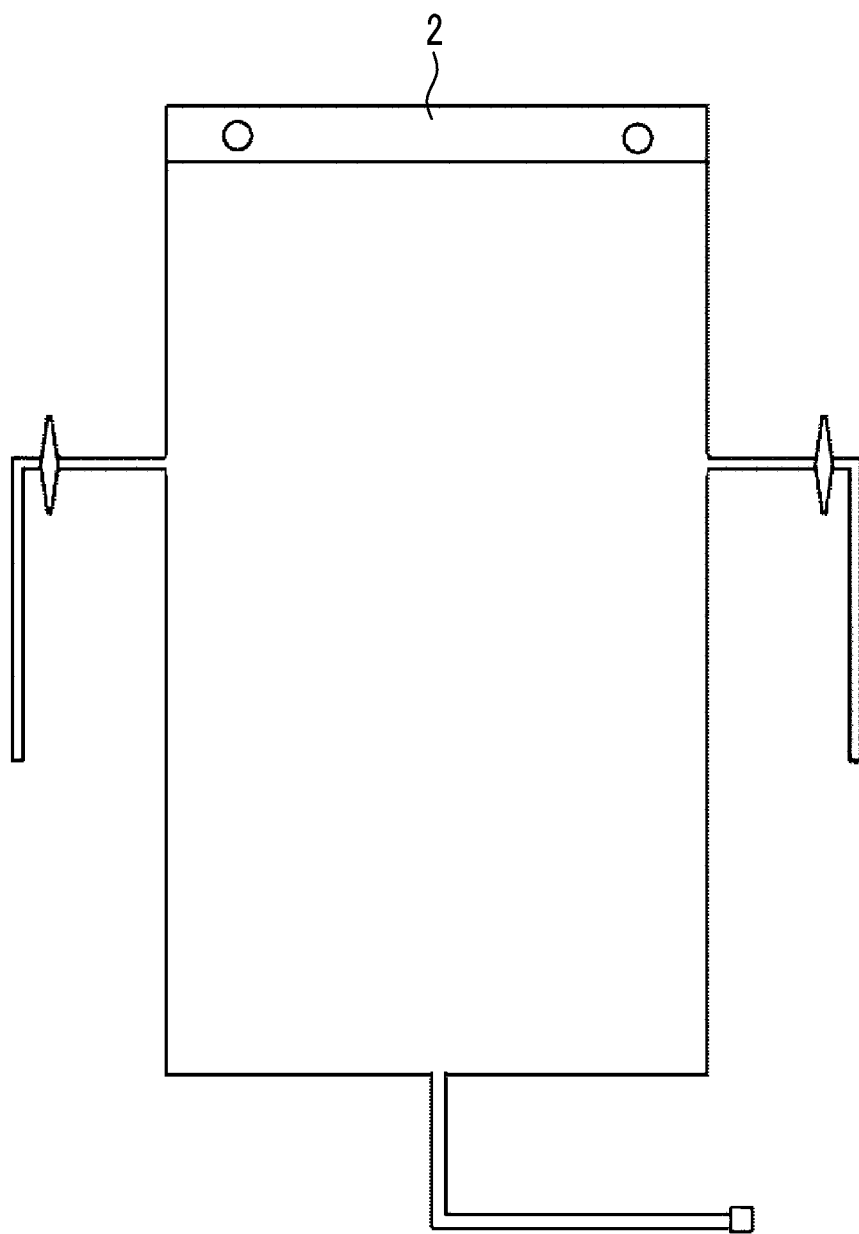
FIG. 9A is a view showing an example of a stirring method according to another embodiment of the disclosed technique.
Figure 9B:
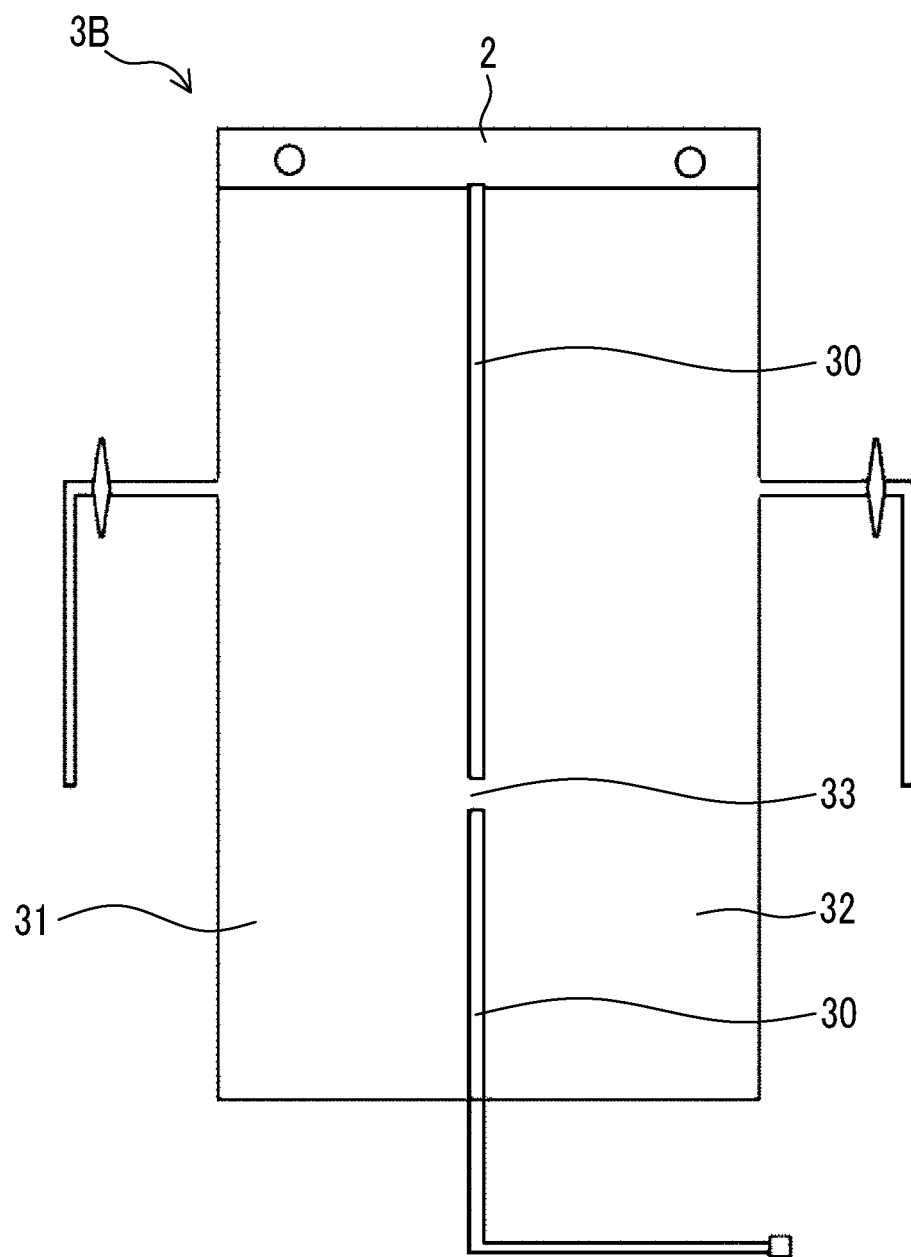
FIG. 9B is a view showing an example of a stirring method according to another embodiment of the disclosed technique.

First, the bag 2 in which a cell suspension is not accommodated is prepared (FIG. 9A). Next, the bag 2 is gripped by the bag gripping clip (FIG. 9B). Accordingly, the partition 30 is formed inside the bag 2, and by this partition 30, the accommodation space inside the bag 2 is divided into the first space 31 and the second space 32 communicating with each other via the communication part 33. The stirring container 3B is configured by gripping the bag 2 by the bag gripping clip.

Figure 9C:
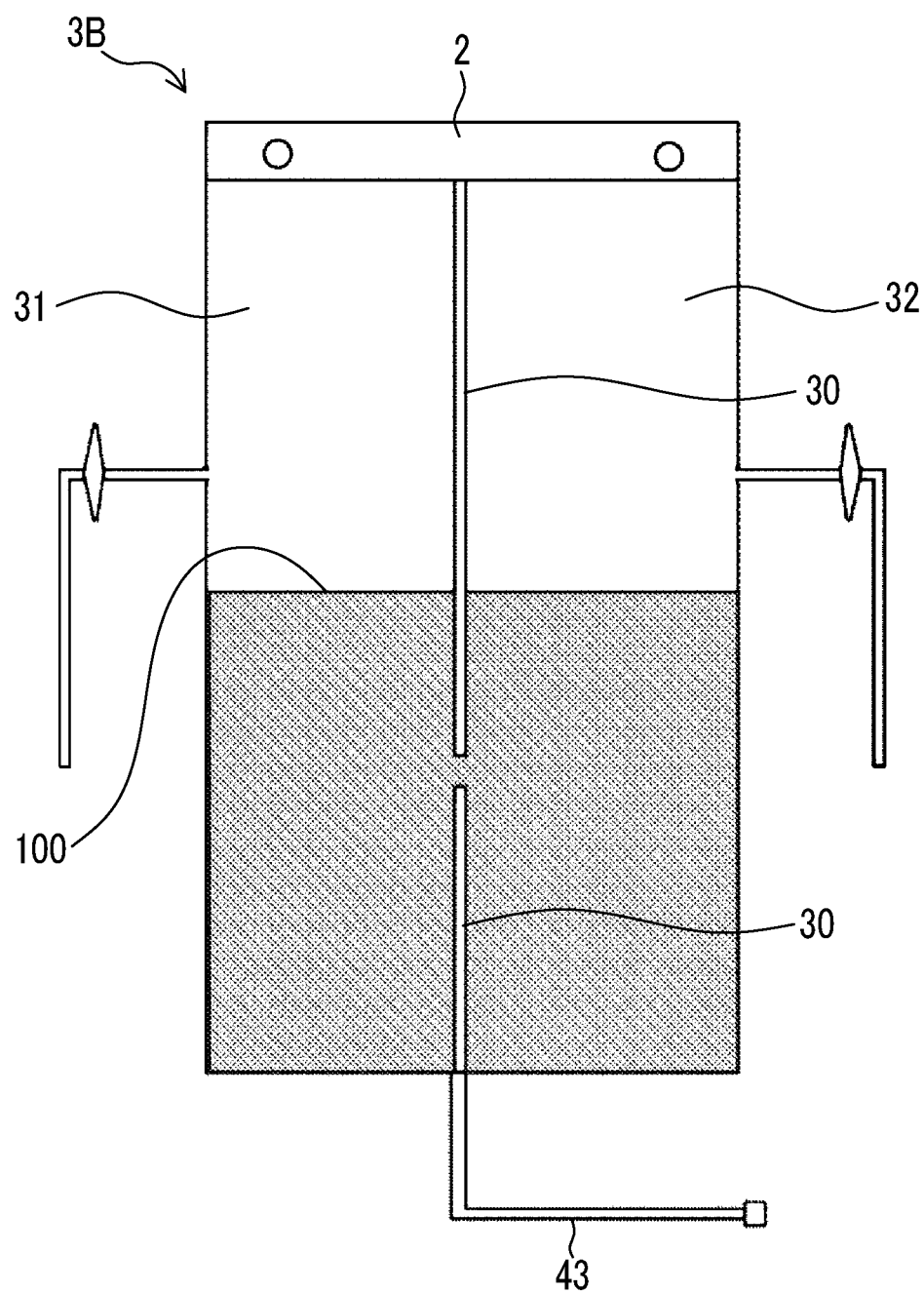
FIG. 9C is a view showing an example of a stirring method according to another embodiment of the disclosed technique.

Next, a direction of the stirring container 3B is fixed so that the first space 31 and the second space 32 of the stirring container 3B are juxtaposed in the horizontal direction, and the cell suspension 100 is injected inside the stirring container 3B via the liquid feeding port 43 (FIG. 9C). The cell suspension 100 is evenly distributed in the first space 31 and the second space 32.

Figure 9D:
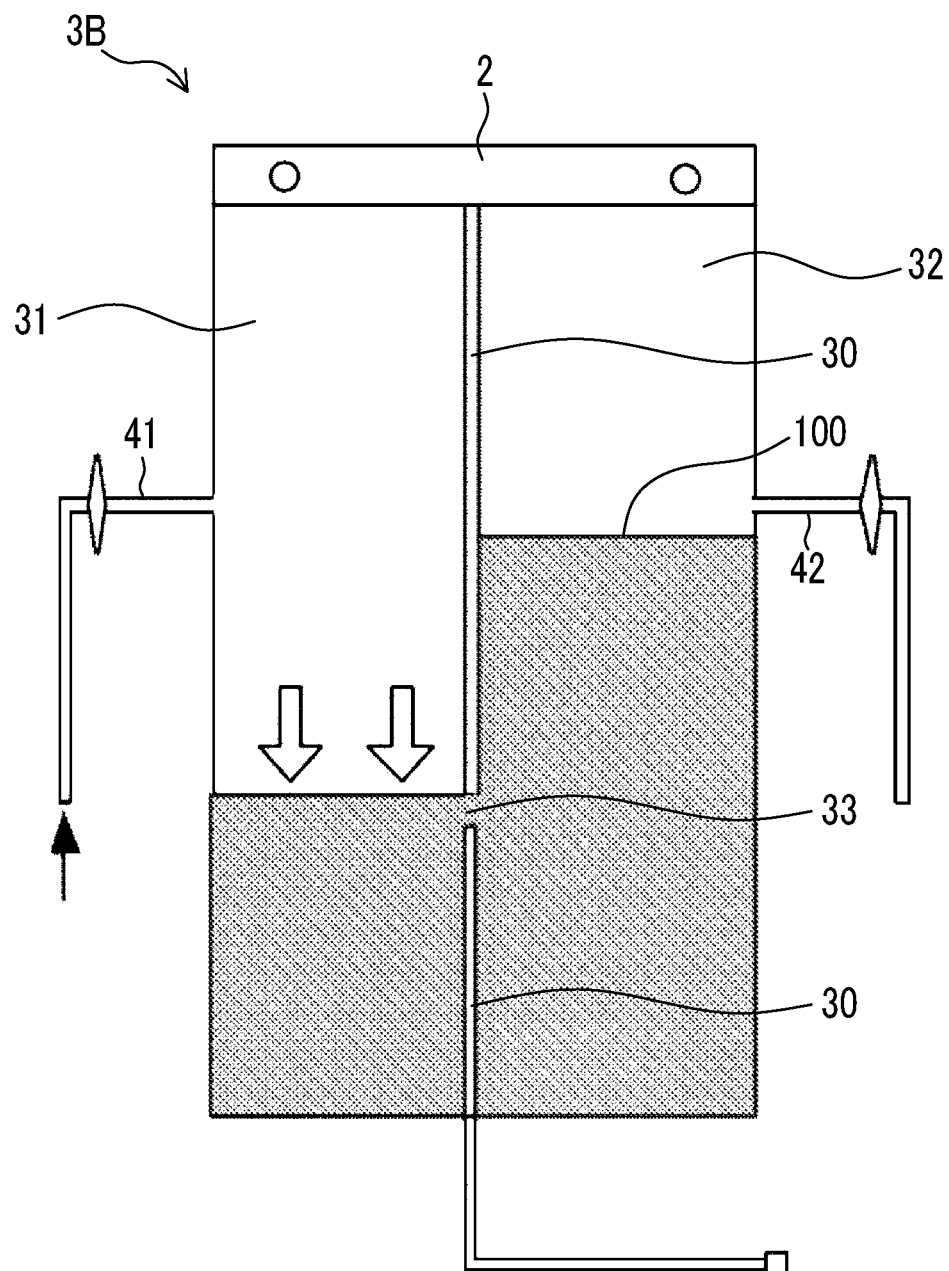
FIG. 9D is a view showing an example of a stirring method according to another embodiment of the disclosed technique.

Next, a gas is introduced into the first space 31 through the ventilation port 41 connected to the first space 31 while the ventilation port 42 connected to the second space 32 is opened. Accordingly, air pressure inside the first space 31 becomes higher than air pressure inside the second space 32. As a result, a liquid surface of the cell suspension 100 accommodated in the first space 31 is pressurized, and some of them are transferred to the second space 32 via the communication part 33. The cell suspension 100 is stirred by transferring the cell suspension 100 to the second space 32 via the communication part 33 (FIG. 9D).

Figure 9E:
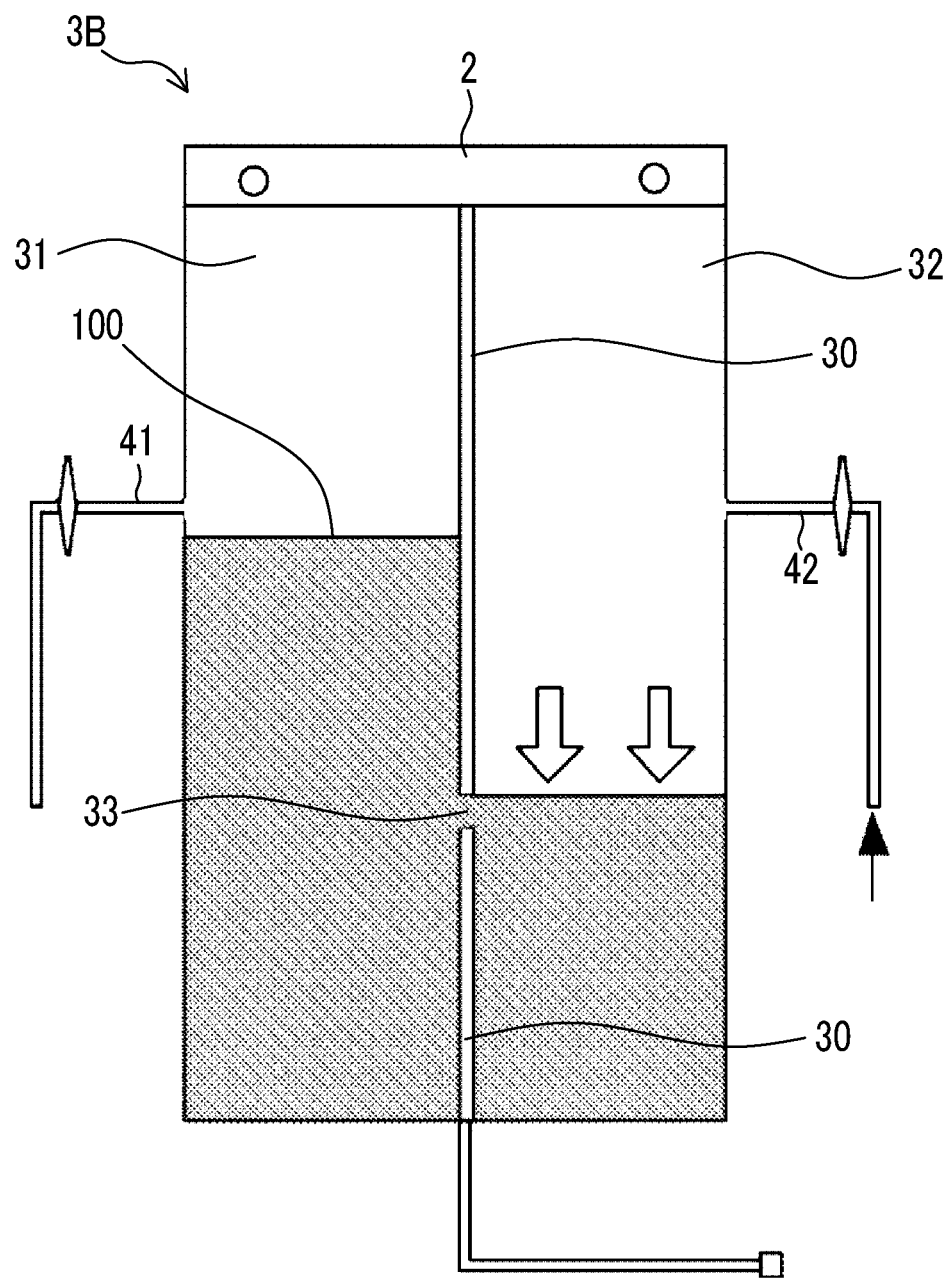
FIG. 9E is a view showing an example of a stirring method according to another embodiment of the disclosed technique.
Figure 9F:
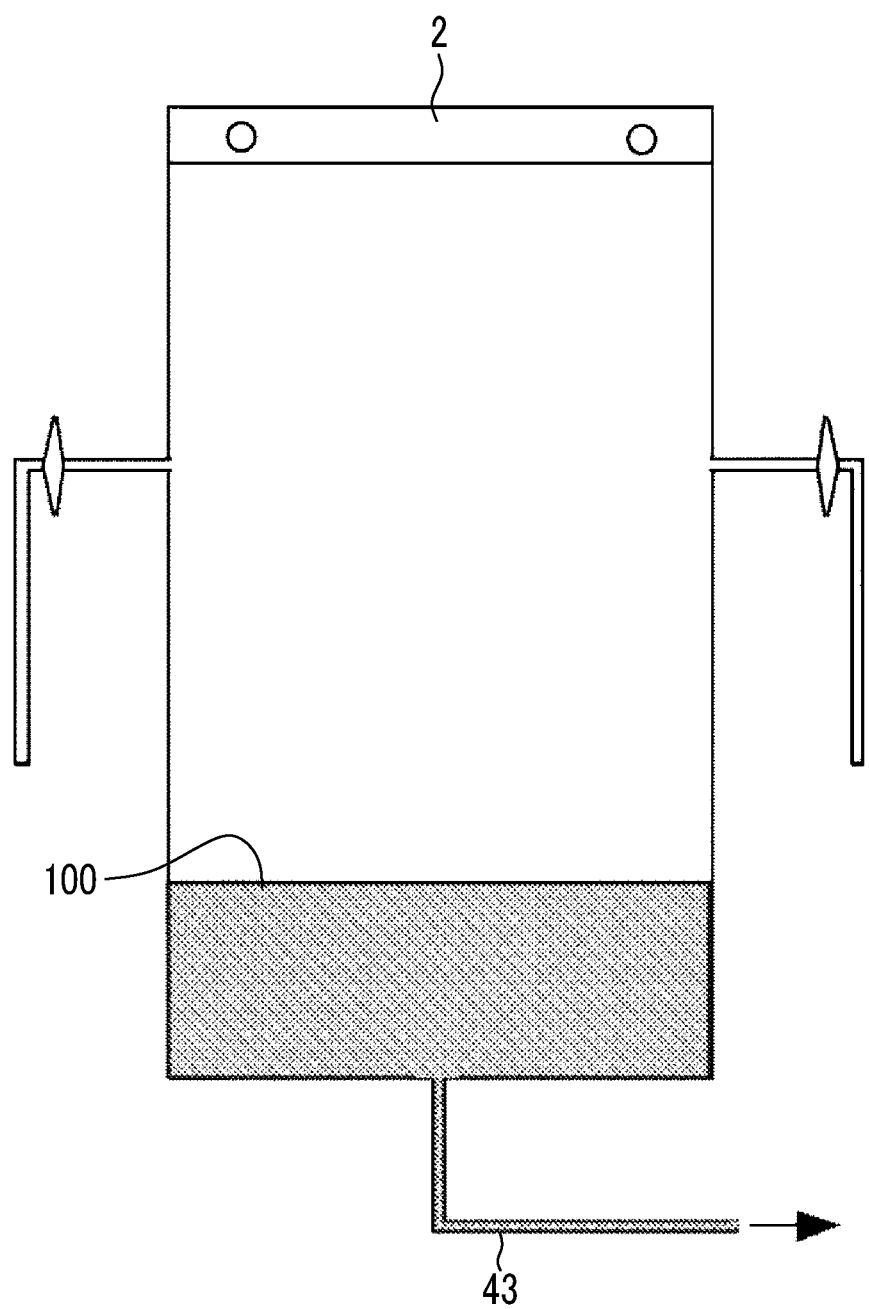
FIG. 9F is a view showing an example of a stirring method according to another embodiment of the disclosed technique.

Next, a gas is introduced into the second space 32 through the ventilation port 42 connected to the second space 32 while the ventilation port 41 connected to the first space 31 is opened. Accordingly, air pressure inside the second space 32 becomes higher than air pressure inside the first space 31. As a result, a liquid surface of the cell suspension 100 accommodated in the second space 32 is pressurized, and some of them are transferred to the first space 31 via the communication part 33. The cell suspension 100 is stirred by transferring the cell suspension 100 to the first space 31 via the communication part 33 (FIG. 9E).

Thereafter, if necessary, the transfer of the cell suspension 100 from the first space 31 to the second space 32, and the transfer of the cell suspension 100 from the second space 32 to the first space 31 may be repeated several times. The transfer of the cell suspension 100 is preferably performed repeatedly until cells are substantially uniformly dispersed in a medium.

Next, the bag gripping clip is detached from the bag 2. Thereby, the partition 30 that separates the first space 31 and the second space 32 is removed. Thereafter, the cell suspension 100 accommodated inside the bag 2 is discharged from the liquid feeding port 43 to the outside of the bag 2. Cell culture may be performed in the bag 2 after the bag gripping clip is detached from the bag 2.

As described above, also in the stirring container 3B having the form of the partition 30 shown in FIG. 8, a cell suspension can be stirred by the same method as the stirring method using the stirring container 3 according to the first embodiment. Accordingly, in the process of stirring a cell suspension, damage to cells can be reduced, and a decrease in cell recovery rate can be inhibited.

Fourth Embodiment

Figure 10:
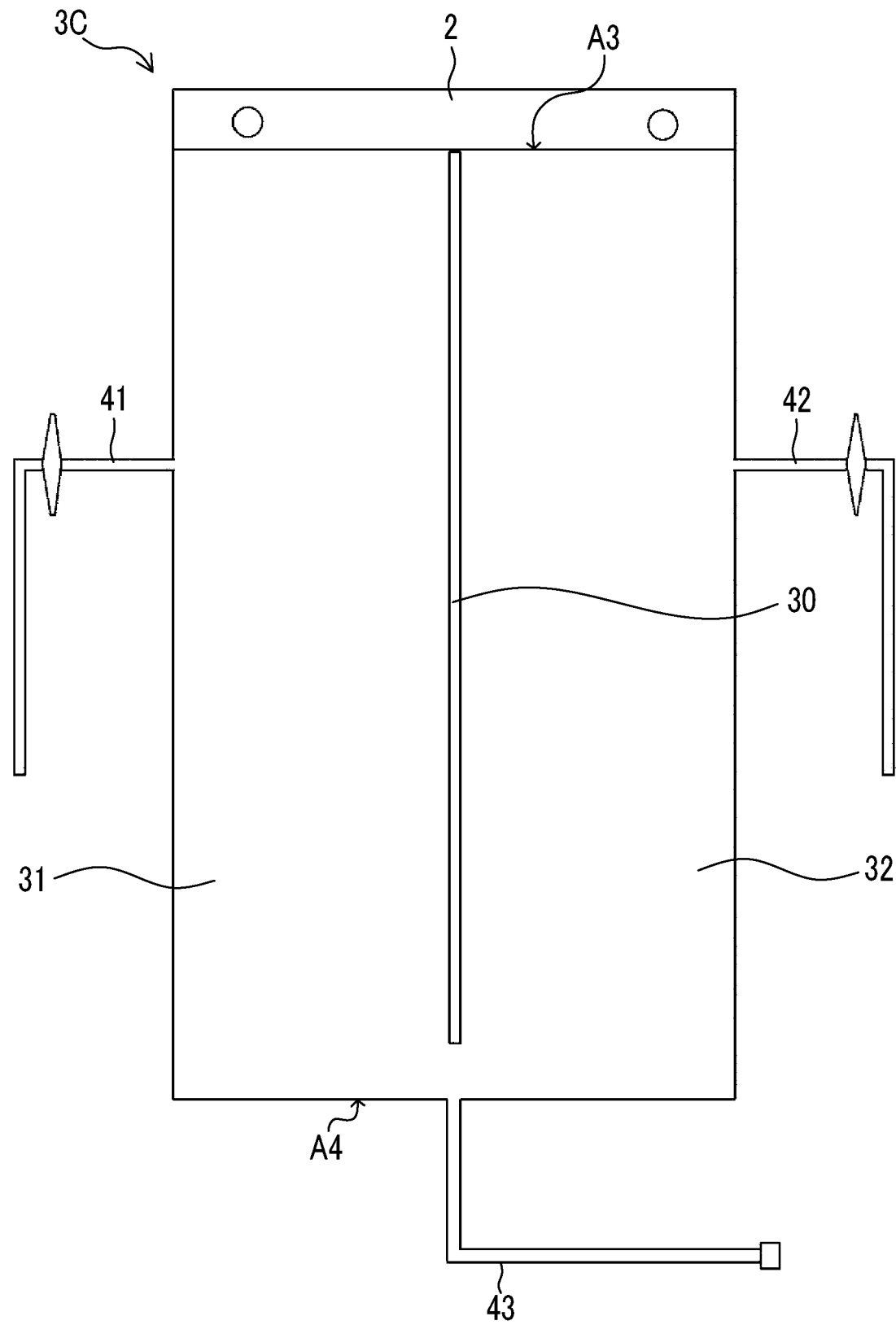
FIG. 10 is a view showing an example of an internal configuration of a stirring container according to another embodiment of the disclosed technique.

FIG. 10 is a plan view showing another embodiment of the partition 30 formed inside the bag 2 by gripping the bag 2 by a bag gripping clip (not shown), and is view showing an example of an internal configuration of a stirring container 3C according to a fourth embodiment of the disclosed technique. The bag gripping clip according to the present embodiment, which is not shown, includes an abutting part abuts on the bag 2 at a portion where the partition 30 shown in FIG. 10 is formed, and a support plate that supports the abutting part. The partition 30 is formed at a portion at which the first film F1 and the second film F2 of the bag 2 gripped by the bag gripping clip 1 are brought into partially close contact with each other.

By the partition 30, an accommodation space inside the bag 2 is divided into a first space 31 and a second space 32. In a case where a cell suspension is stirred using the stirring container 3C, the first space 31 and the second space 32 are juxtaposed in a horizontal direction. In addition, the partition 30 forms a communication part 33 that allows the first space 31 and the second space 32 to communicate with each other. That is, in the stirring container 3C, the partition 30 has a portion extending in a cross direction crossing a side A3 and a side A4 between the side A3, which is the end of the bag 2 that is rectangular in a front view, and the side A4 which is the end of the other side of the bag 2 facing the side A3, and the communication part 33 is provided on an extension line of a portion extending in the cross direction of the partition 30. More specifically, the partition 30 has a portion extending linearly from the side A3 toward the side A4, and the communication part 33 is provided between the partition 30 and the side A4. The partition 30 has a portion extending linearly from the side A4 toward the side A3, and the communication part 33 may be provided between the partition 30 and the side A3.

The bag 2 includes a ventilation port 41 connected to the first space 31 and a ventilation port 42 connected to the second space 32. It is possible to introduce gas into the bag 2 from the outside of the bag 2 through the ventilation ports 41 and 42. In addition, a liquid feeding port 43 is provided at the bottom part of the bag 2, and through the liquid feeding port 43, a cell suspension can be discharged from the inside of the bag 2, or a cell suspension can be injected into the bag 2.

Since the method of stirring a cell suspension using the stirring container 3C is the same as the case of using the above-described stirring container 3B according to the third embodiment, the description thereof is omitted.

Fifth Embodiment

Figure 11A:
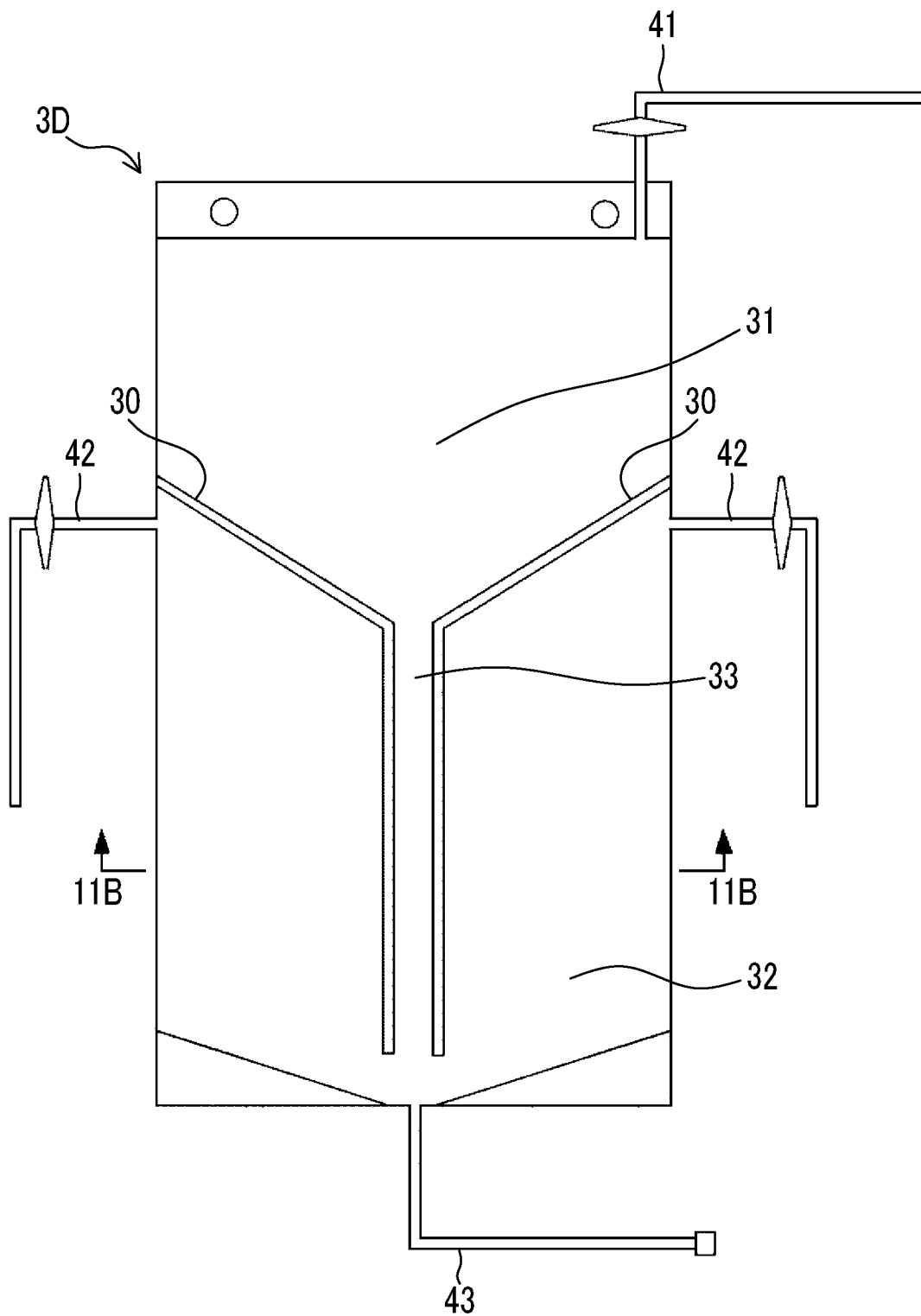
FIG. 11A is a front view showing an example of a configuration of a stirring container according to another embodiment of the disclosed technique.
Figure 11B:
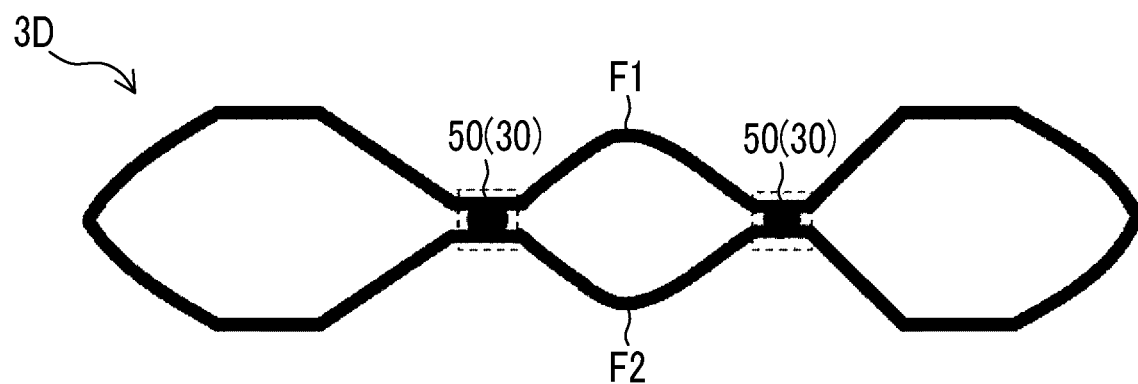
FIG. 11B is a cross-sectional view taken along line 11B-11B in FIG. 11A.

FIG. 11A is a front view showing an example of a configuration of a stirring container 3D according to a fifth embodiment of the disclosed technique; FIG. 11B is a cross-sectional view taken along line 11B-11B in FIG. 11A, and FIG. 12 is an enlarged view of a portion surrounded by a broken line shown in FIG. 11B and is a cross-sectional view showing an example of a configuration of a zip mechanism 50.

As shown in FIG. 11A, the stirring container 3D includes, inside thereof, a partition 30 of the same form as that of the stirring container 3 (refer to FIG. 4) according to the first embodiment. In the stirring container 3 according to the first embodiment, the partition 30 is formed by gripping the bag 2 by the bag gripping clip 1. On the other hand, the stirring container 3D according to the present embodiment includes the openable and closable zip mechanism 50 for bringing the first film F1 and the second film F2 which face each other into partially close contact with each other, and the partition 30 is formed by closing the zip mechanism 50. By the partition 30, an accommodation space inside the stirring container 3D is divided into a first space 31 and a second space 32. In addition, the partition 30 forms a communication part 33 that allows the first space 31 and the second space 32 to communicate with each other.

Figure 12:
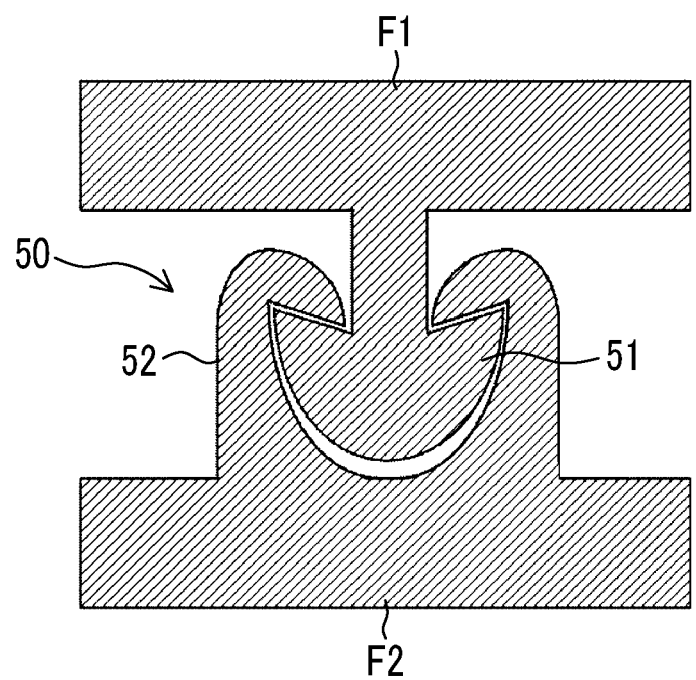
FIG. 12 is a cross-sectional view showing an example of a configuration of a zip mechanism according to an embodiment of the disclosed technique.

As shown in FIG. 12, the zip mechanism 50 is configured by including a convex portion 51 formed on the inner side surface of the first film F1, and a recessed portion 52 disposed opposite to the convex portion 51 on the inner side surface of the second film F2. By fitting the convex portion 51 to the recessed portion 52, the zip mechanism 50 is closed, thereby bringing the first film F1 and the second film F2 into partially close contact with each other at a portion on which the zip mechanism 50 is formed, and forming the partition 30 inside the stirring container 3D. In addition, the zip mechanism 50 becomes in an open state by releasing fitting between the convex portion 51 and the recessed portion 52, and thereby the partition 30 is removed from the inside of the stirring container 3D.

The stirring container 3D includes a ventilation port 41 connected to the first space 31 and a ventilation port 42 connected to the second space 32. It is possible to introduce gas into the stirring container 3D from the outside of the stirring container 3D through the ventilation ports 41 and 42. In addition, a liquid feeding port 43 is provided at the bottom part of the second space 32, and through the liquid feeding port 43, a cell suspension can be discharged from the inside of the stirring container 3D, or a cell suspension can be injected into the stirring container 3D.

A method of stirring a cell suspension using the stirring container 3D is the same as the case of using the above-described stirring container 3 according to the first embodiment. According to the stirring container 3D, after the stirring process, by opening the zip mechanism 50, the partition 30 inside the stirring container 3D is removed, and thereby a cell suspension is discharged to the outside of the stirring container 3D, a structure that hinders the discharge is removed, and thereby it is possible to prevent cells from remaining inside the stirring container 3D. Accordingly, a decrease in cell recovery rate can be inhibited.

In the stirring container 3D, the form of the partition 30 may be the same as the form of the partition 30 of the stirring container 3B shown in FIG. 8, or may be the same as the form of the partition 30 of the stirring container 3C shown in FIG. 10.

This application claims the priority of Japanese Patent Application No. 2017-184952 filed on Sep. 26, 2017, the entire contents of which are incorporated herein by reference. In addition, all documents, patent applications, and technical standards described in the present specification are incorporated herein by reference to the same extent as a case where it is specifically and individually stated that individual documents, patent applications, and technical standards are incorporated by reference.

What is claimed is:

1. A bag gripping clip, which is attachable to and detachable from a bag,
    wherein, in a case where the bag that forms an accommodation space between a first film and a second film facing the first film is gripped by the clip, a pressing force for bringing the first film and the second film into partially close contact with each other is applied to the bag, and a partition, formed by the partially close contact, that divides the accommodation space into a plurality of spaces communicating with each other via a communication part, where the first film and second film are not fused, is formed,
    the partition divides the accommodation space into a first space, and a second space disposed below the first space in a vertical direction, and
    the partition forms a pair of downward slopes at a bottom part of the first space, and forms the communication part of which one end is connected to a lowest position of the bottom part of the pair of downward slopes and which extends into the second space.

2. The bag gripping clip according to claim 1,
    wherein the partition includes a portion extending in a cross direction crossing a first side and a second side of the bag between the first side and the second side facing the first side, and
    the communication part is provided on an extension line of the portion extending in the cross direction of the partition.

3. The bag gripping clip according to claim 2, wherein the communication part is provided between the partition and the first side or between the partition and the second side.

4. The bag gripping clip according to claim 1, further comprising an abutting part that abuts on the bag and is made of an elastic body.

5. The bag gripping clip according to claim 4, further comprising a support member that supports the abutting part.

6. The bag gripping clip according to claim 1, wherein the pressing force is applied by a magnetic force.

7. The bag gripping clip according to claim 1, further comprising:
    a first abutting part that abuts on the first film;
    a second abutting part that abuts on a portion of the first film, which is different from a portion on which the first abutting part abuts;
    a third abutting part that abuts on the second film and sandwiches the bag between the first abutting part and the third abutting part to form one part of the partition separating the first space and the second space, and one part of the partition forming the communication part; and a fourth abutting part that abuts on the second film and sandwiches the bag between the second abutting part and the fourth abutting part to form the other part of the partition separating the first space and the second space, and the other part of the partition forming the communication part.

8. The bag gripping clip according to claim 7, further comprising:
a first fixing part that fixes a relative position between the first abutting part and the second abutting part; and
a second fixing part that fixes a relative position between the third abutting part and the fourth abutting part.

9. The bag gripping clip according to claim 8, further comprising:
a first sliding mechanism for changing a relative position between the first abutting part and the second abutting part by sliding at least one of the first abutting part or the second abutting part; and
a second sliding mechanism for changing a relative position between the third abutting part and the fourth abutting part by sliding at least one of the third abutting part or the fourth abutting part.

10. A container comprising:
the bag gripping clip according to claim 1; and
a bag gripped by the bag gripping clip.

11. The container according to claim 10, further comprising a ventilation port that is connected to each of the plurality of spaces.

12. A stirring method for stirring a liquid using a container including a bag gripping clip, which is attachable to and detachable from a bag, in which, in a case where the bag that forms an accommodation space between a first film and a second film facing the first film is gripped by the clip, a pressing force for bringing the first film and the second film into partially close contact with each other is applied to the bag, and a partition that divides the accommodation space into a first space and a second space which communicate with each other via a communication part is formed; and a bag gripped by the bag gripping clip, the stirring method comprising:
a first step of gripping the bag by the bag gripping clip;
a second step of accommodating a liquid in the second space after the first step; and
a third step of forming an air pressure difference between the first space and the second space to transfer the liquid accommodated in the second space to the first space via the communication part.

13. The stirring method according to claim 12, further comprising a fourth step of transferring the liquid accommodated in the first space to the second space via the communication part after the third step.

14. The stirring method according to claim 13, wherein the third step and the fourth step are alternately and repeatedly performed.

15. The stirring method according to claim 12, further comprising:
a fifth step of detaching the bag gripping clip from the bag in a state in which the liquid is accommodated inside the bag; and
a sixth step of discharging the liquid accommodated inside the bag to the outside of the bag after the fifth step.

16. A bag gripping clip, which is attachable to and detachable from a bag, wherein, in a case where the bag that forms an accommodation space between a first film and a second film facing the first film is gripped by the clip, a pressing force for bringing the first film and the second film into partially close contact with each other is applied to the bag, and a partition that divides the accommodation space into a plurality of spaces communicating with each other via a communication part is formed, and
the partition divides the accommodation space into a first space, and a second space disposed below the first space in a vertical direction,
further comprising:
a first abutting part that abuts on the first film;
a second abutting part that abuts on a portion of the first film, which is different from a portion on which the first abutting part abuts;
a third abutting part that abuts on the second film and sandwiches the bag between the first abutting part and the third abutting part to form one part of the partition separating the first space and the second space, and one part of the partition forming the communication part;
a fourth abutting part that abuts on the second film and sandwiches the bag between the second abutting part and the fourth abutting part to form the other part of the partition separating the first space and the second space, and the other part of the partition forming the communication part;
a first fixing part that fixes a relative position between the first abutting part and the second abutting part;
a second fixing part that fixes a relative position between the third abutting part and the fourth abutting part;
a first sliding mechanism for changing a relative position between the first abutting part and the second abutting part by sliding at least one of the first abutting part or the second abutting part; and
a second sliding mechanism for changing a relative position between the third abutting part and the fourth abutting part by sliding at least one of the third abutting part or the fourth abutting part.

17. A container comprising:
a bag gripping clip;
a bag gripped by the bag gripping clip; and
a ventilation port that is connected to each of the plurality of spaces;
wherein the bag gripping clip is attachable to and detachable from the bag, and
in a case where the bag that forms an accommodation space between a first film and a second film facing the first film is gripped by the clip, a pressing force for bringing the first film and the second film into partially close contact with each other is applied to the bag, and a partition, formed by the partially close contact, that divides the accommodation space into a plurality of spaces communicating with each other via a communication part, where the first film and second film are not fused, is formed, and
wherein the partition forms a pair of downward slopes.

18. A bag gripping clip, which is attachable to and detachable from a bag,
wherein, in a case where the bag that forms an accommodation space between a first film and a second film facing the first film is gripped by the clip, a pressing force for bringing the first film and the second film into partially close contact with each other is applied to the bag, and a partition, formed by the partially close contact, that divides the accommodation space into a plurality of spaces communicating with each other via a communication part, where the first film and second film are not fused, is formed, and the pressing force is applied by a magnetic force generated by electromagnets.

19. A bag gripping clip, which is attachable to and detachable from a bag, wherein, in a case where the bag that forms an accommodation space between a first film and a second film facing the first film is gripped by the clip, a pressing force for bringing the first film and the second film into partially close contact with each other is applied to the bag, and a partition, formed by the partially close contact, that divides the accommodation space into a plurality of spaces communicating with each other via a communication part, where the first film and second film are not fused, is formed, the partition, which forms a pair of downward slopes, includes a first portion extending from a first side of the bag toward a second side, which is facing the first side, of the bag and a second portion extending from the second side of the bag to the first side of the bag, and a gap between the first portion and the second portion constitutes the communication part.

\* \* \* \* \*